United States Patent [19]
Ito et al.

[11] Patent Number: 5,321,675
[45] Date of Patent: Jun. 14, 1994

[54] PIT SPACING IN THE SERVO FIELD OF AN OPTICAL DISK FOR SPEED AND DIRECTION DETECTION AND DATA RETRIEVAL

[75] Inventors: Osamu Ito; Masaharu Ogawa; Kyosuke Yoshimoto; Kunimaro Tanaka; Teruo Furukawa; Masafumi Ototake, all of Amagasaki, Japan

[73] Assignee: Mitsubishi Denki Kabushiki Kaisha, Tokyo, Japan

[21] Appl. No.: 318,594

[22] Filed: Feb. 28, 1989

[30] Foreign Application Priority Data

Mar. 3, 1988 [JP] Japan ................................. 63-50139
Mar. 23, 1988 [JP] Japan ................................. 63-70307
Mar. 23, 1988 [JP] Japan ................................. 63-70308

[51] Int. Cl.$^5$ ............................................. G11B 7/085
[52] U.S. Cl. .................................... 369/32; 369/44.26; 369/44.28; 369/275.4
[58] Field of Search ...................... 369/32, 124, 43, 47, 369/48, 54, 58, 59, 44.13, 49, 51, 57, 44.26, 44.28, 44.34, 275.3, 275.4; 360/77.06, 77.07, 77.08, 35.1, 48, 49; 358/313

[56] References Cited

U.S. PATENT DOCUMENTS

| | | | |
|---|---|---|---|
| 4,779,253 | 10/1988 | Getreuer | 369/109 X |
| 4,792,861 | 12/1988 | Kawase et al. | 360/35.1 |
| 4,823,212 | 4/1989 | Knowles et al. | 360/77.08 |
| 4,843,601 | 6/1989 | Eguchi et al. | 369/44.26 |
| 4,951,275 | 8/1990 | Saitoh et al. | 369/44.34 X |
| 4,967,403 | 10/1990 | Ogawa et al. | 369/44.26 |
| 5,063,546 | 11/1991 | Ito et al. | 369/44.26 X |

OTHER PUBLICATIONS

Momen, SPIE vol. 695, "Optical Mass Data Storage 11" (1986), 112-115.
Ronald and Charles, SPIE vol. 529 "Servo and Clock Sampling in the Optimern 1000", Optical Mass data Storage (1985) 140-144.

*Primary Examiner*—Aristotelis Psitos
*Assistant Examiner*—Thang V. Tran
*Attorney, Agent, or Firm*—Wolf, Greenfield & Sacks

[57] ABSTRACT

A sampled servo type optical disc and its driving apparatus is disclosed, in which by cyclically repeating wobbled pits or address pits of the optical disc composed by two significant digits at every N tracks, and preformatting by patterns spaced in different intervals at every track, when the optical disc driving apparatus seeks an object track, the seek direction of the optical head can be detected by the sequence of change of the pattern, and its seek speed can be detected at high speed by the detected result of the pattern, ensuring the speed control of the optical head in response to the detected seek direction and speed.

10 Claims, 26 Drawing Sheets

Fig. 7(b)

| n \ a(n,k) | a(n,1) | a(n,2) | a(n,3) | a(n,4) | a(n,5) | a(n,6) | a(n,7) | a(n,8) | a(n,9) | a(n,10) | a(n,11) | a(n,12) |
|---|---|---|---|---|---|---|---|---|---|---|---|---|
| 1 | 1 | | | | | | | | | | 1 | |
| 2 | 1 | | | | | | | | | 1 | | |
| 3 | 1 | | | | | | | | 1 | | | |
| 4 | 1 | | | | | | | 1 | | | | |
| 5 | 1 | | | | | | 1 | | | | | |
| 6 | | 1 | | | | | 1 | | | | | |
| 7 | | 1 | | | | | | 1 | | | | |
| 8 | | 1 | | | | | | | 1 | | | |
| 9 | | 1 | | | | | | | | 1 | | |
| 10 | | 1 | | | | | | | | | 1 | |
| 11 | | | 1 | | | | | | | | 1 | |
| 12 | | | 1 | | | | | | | 1 | | |
| 13 | | | 1 | | | | | | 1 | | | |
| 14 | | | 1 | | | | | 1 | | | | |
| 15 | | | | 1 | | | | 1 | | | | |
| 16 | | | | 1 | | | | | 1 | | | |
| 17 | | | | 1 | | | | | | 1 | | |
| 18 | | | | 1 | | | | | | | 1 | |
| 19 | | | | | 1 | | | | | | 1 | |
| 20 | | | | | 1 | | | | | 1 | | |
| 21 | | | | | | 1 | | | | 1 | | |
| 22 | | | | | | 1 | | | | | 1 | |
| 23 | | | | | | 1 | | | | | | 1 |
| 24 | | | | | 1 | | | | | | | 1 |
| 25 | | | | 1 | | | | | | | | 1 |
| 26 | | | 1 | | | | | | | | | 1 |
| 27 | | 1 | | | | | | | | | | 1 |
| 28 | 1 | | | | | | | | | | | 1 |

Fig. 7(c)

| n \ a(n,k) | a(n,1) | a(n,2) | a(n,3) | a(n,4) | a(n,5) | a(n,6) | a(n,7) | a(n,8) | a(n,9) | a(n,10) | a(n,11) | a(n,12) |
|---|---|---|---|---|---|---|---|---|---|---|---|---|
| 1  | 1 |   |   |   |   |   |   |   |   |   | 1 |   |
| 2  | 1 |   |   |   |   |   |   |   |   | 1 |   |   |
| 3  | 1 |   |   |   |   |   |   |   | 1 |   |   |   |
| 4  | 1 |   |   |   |   |   |   | 1 |   |   |   |   |
| 5  | 1 |   |   |   |   |   | 1 |   |   |   |   |   |
| 6  | 1 |   |   |   |   | 1 |   |   |   |   |   |   |
| 7  |   | 1 |   |   |   | 1 |   |   |   |   |   |   |
| 8  |   | 1 |   |   |   |   | 1 |   |   |   |   |   |
| 9  |   | 1 |   |   |   |   |   | 1 |   |   |   |   |
| 10 |   | 1 |   |   |   |   |   |   | 1 |   |   |   |
| 11 |   | 1 |   |   |   |   |   |   |   | 1 |   |   |
| 12 |   | 1 |   |   |   |   |   |   |   |   | 1 |   |
| 13 |   |   | 1 |   |   |   |   |   |   |   | 1 |   |
| 14 |   |   | 1 |   |   |   |   |   |   | 1 |   |   |
| 15 |   |   | 1 |   |   |   |   |   | 1 |   |   |   |
| 16 |   |   | 1 |   |   |   |   | 1 |   |   |   |   |
| 17 |   |   |   | 1 |   |   |   | 1 |   |   |   |   |
| 18 |   |   |   | 1 |   |   |   |   | 1 |   |   |   |
| 19 |   |   |   | 1 |   |   |   |   |   | 1 |   |   |
| 20 |   |   |   | 1 |   |   |   |   |   |   | 1 |   |
| 21 |   |   |   |   | 1 |   |   |   |   |   | 1 |   |
| 22 |   |   |   |   | 1 |   |   |   |   | 1 |   |   |
| 23 |   |   |   |   |   | 1 |   |   |   | 1 |   |   |
| 24 |   |   |   |   |   | 1 |   |   |   |   | 1 |   |
| 25 |   |   |   |   |   |   | 1 |   |   |   | 1 |   |
| 26 |   |   |   |   |   |   | 1 |   |   |   |   | 1 |
| 27 |   |   |   |   |   | 1 |   |   |   |   |   | 1 |
| 28 |   |   |   |   | 1 |   |   |   |   |   |   | 1 |
| 29 |   |   |   | 1 |   |   |   |   |   |   |   | 1 |
| 30 |   |   | 1 |   |   |   |   |   |   |   |   | 1 |
| 31 |   | 1 |   |   |   |   |   |   |   |   |   | 1 |
| 32 | 1 |   |   |   |   |   |   |   |   |   |   | 1 |

| K | N |
|---|---|
| 8 | 12 |
| 9 | 18 |
| 10 | 24 |
| 11 | 32 |
| 12 | 40 |

| K | N |
|---|---|
| 8 | 8 |
| 9 | 12 |
| 10 | 18 |
| 11 | 24 |
| 12 | 32 |

| K | N |
|---|---|
| 8 | 12 |
| 10 | 20 |
| 12 | 32 |

| K | N |
|---|---|
| 8 | 8 |
| 10 | 18 |
| 12 | 28 |

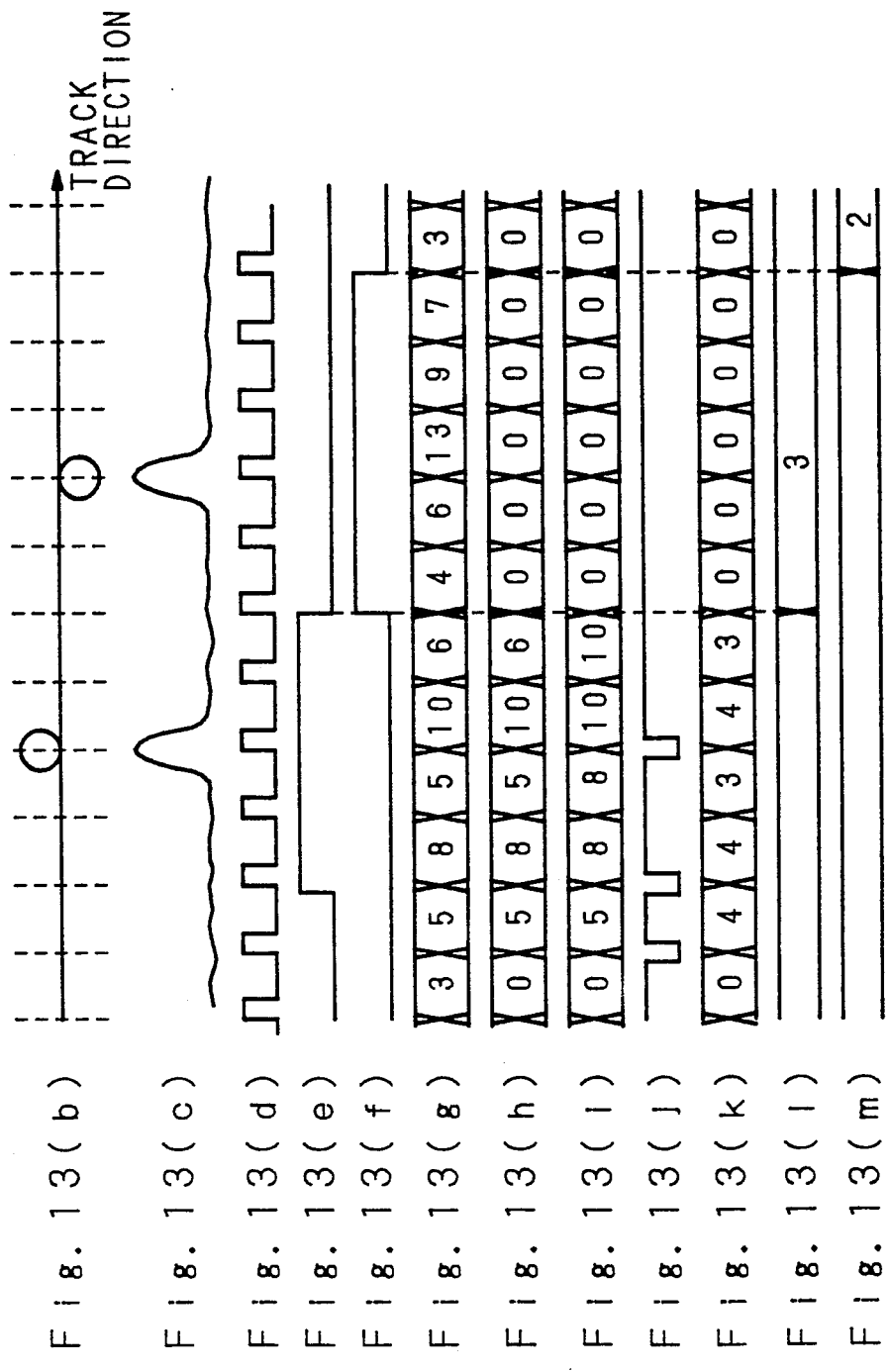

Fig. 14(c)

| n \ a(n,k) | a(n,1) | a(n,2) | a(n,3) | a(n,4) | a(n,5) | a(n,6) | a(n,7) | a(n,8) | a(n,9) | a(n,10) |
|---|---|---|---|---|---|---|---|---|---|---|
| 1 | 1 | | | | | | | | 1 | |
| 2 | 1 | | | | | | | 1 | | |
| 3 | 1 | | | | | | 1 | | | |
| 4 | 1 | | | | | 1 | | | | |
| 5 | | 1 | | | | 1 | | | | |
| 6 | | 1 | | | | | 1 | | | |
| 7 | | 1 | | | | | | 1 | | |
| 8 | | 1 | | | | | | | 1 | |
| 9 | | | 1 | | | | | | 1 | |
| 10 | | | 1 | | | | | 1 | | |
| 11 | | | | 1 | | | | 1 | | |
| 12 | | | | 1 | | | | | 1 | |
| 13 | | | | | 1 | | | | 1 | |
| 14 | | | | | 1 | | | | | 1 |
| 15 | | | | 1 | | | | | | 1 |
| 16 | | | 1 | | | | | | | 1 |
| 17 | | 1 | | | | | | | | 1 |
| 18 | 1 | | | | | | | | | 1 |

Fig.14(d)

| n \ a(n,k) | a(n,1) | a(n,2) | a(n,3) | a(n,4) | a(n,5) | a(n,6) | a(n,7) | a(n,8) | a(n,9) | a(n,10) | a(n,11) | a(n,12) |
|---|---|---|---|---|---|---|---|---|---|---|---|---|
| 1 | 1 | | | | | | | | | | 1 | |
| 2 | 1 | | | | | | | | | 1 | | |
| 3 | 1 | | | | | | | | 1 | | | |
| 4 | 1 | | | | | | | 1 | | | | |
| 5 | 1 | | | | | | 1 | | | | | |
| 6 | 1 | | | | | 1 | | | | | | |
| 7 | | 1 | | | | 1 | | | | | | |
| 8 | | 1 | | | | | 1 | | | | | |
| 9 | | 1 | | | | | | 1 | | | | |
| 10 | | 1 | | | | | | | 1 | | | |
| 11 | | 1 | | | | | | | | 1 | | |
| 12 | | 1 | | | | | | | | | 1 | |
| 13 | | | 1 | | | | | | | | 1 | |
| 14 | | | 1 | | | | | | | 1 | | |
| 15 | | | 1 | | | | | | 1 | | | |
| 16 | | | 1 | | | | | 1 | | | | |
| 17 | | | | 1 | | | | 1 | | | | |
| 18 | | | | 1 | | | | | 1 | | | |
| 19 | | | | 1 | | | | | | 1 | | |
| 20 | | | | 1 | | | | | | | 1 | |
| 21 | | | | | 1 | | | | | | 1 | |
| 22 | | | | | 1 | | | | | 1 | | |
| 23 | | | | | | 1 | | | | 1 | | |
| 24 | | | | | | 1 | | | | | 1 | |
| 25 | | | | | | | 1 | | | | 1 | |
| 26 | | | | | | | | 1 | | | | 1 |
| 27 | | | | | | 1 | | | | | | 1 |
| 28 | | | | | 1 | | | | | | | 1 |
| 29 | | | | 1 | | | | | | | | 1 |
| 30 | | | 1 | | | | | | | | | 1 |
| 31 | | 1 | | | | | | | | | | 1 |
| 32 | 1 | | | | | | | | | | | 1 |

| K | N |
|---|---|
| 8 | 12 |
| 9 | 18 |
| 10 | 24 |
| 11 | 32 |
| 12 | 40 |

| K | N |
|---|---|
| 8 | 8 |
| 9 | 12 |
| 10 | 18 |
| 11 | 24 |
| 12 | 32 |

| K | N |
|---|---|
| 8 | 12 |
| 10 | 20 |
| 12 | 32 |

| K | N |
|---|---|
| 8 | 8 |
| 10 | 18 |
| 12 | 28 |

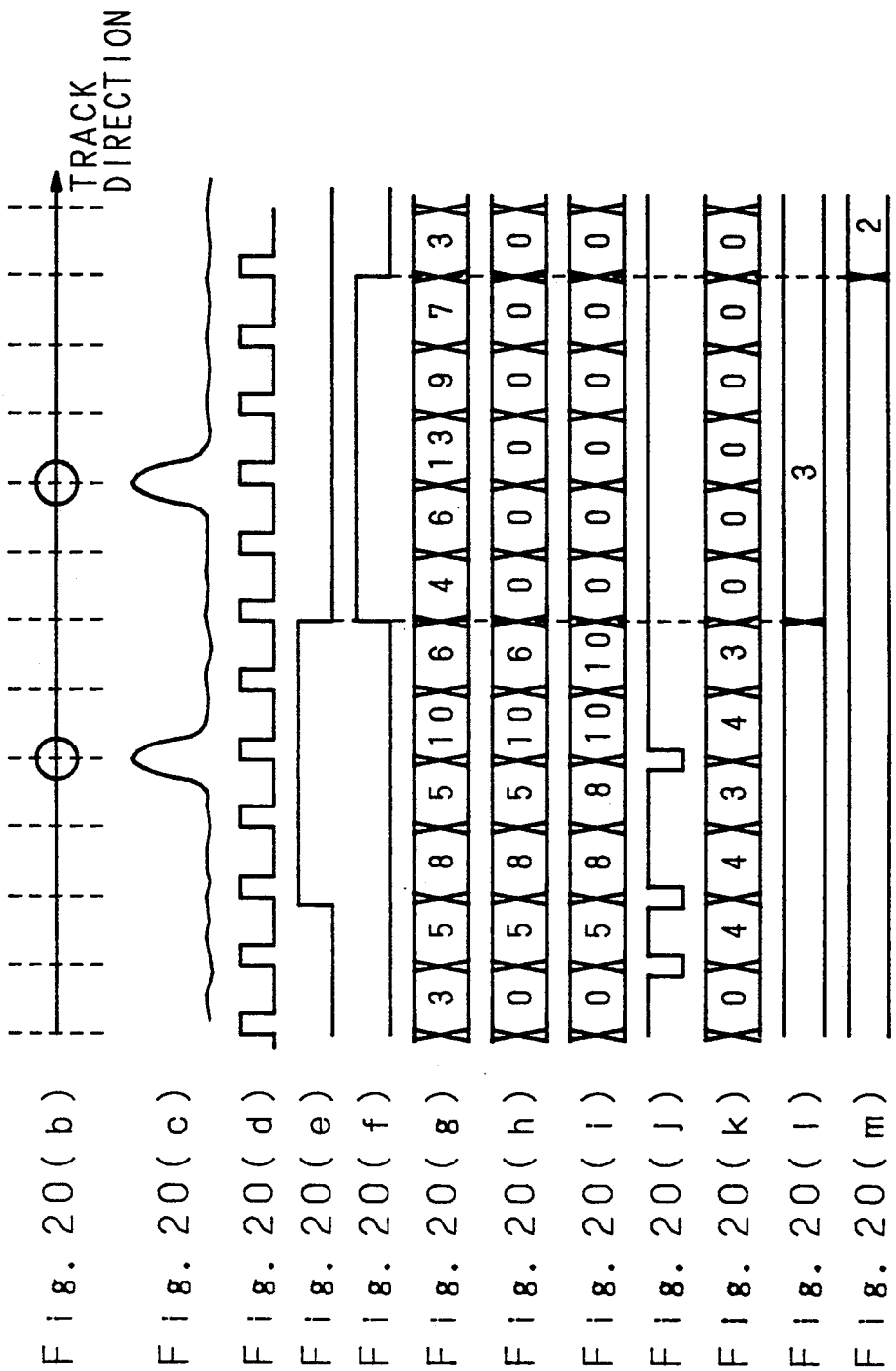

PIT SPACING IN THE SERVO FIELD OF AN OPTICAL DISK FOR SPEED AND DIRECTION DETECTION AND DATA RETRIEVAL

BACKGROUND OF THE INVENTION

1. Field of the Invention

The present invention relates to an optical disc which is subjected to a sampled servo type tracking and its driving apparatus, particularly, it relates to improvements of the pit configuration for sampled servo preformatted in the optical disc.

2. Description of the Prior Art

FIG. 1 shows a track sector format of a conventional optical disc described in SPIE, vol. 695, Optical Mass Data Storage 2 (1986), Page 112. In the figure, (90) indicates a sector structure per one round of track comprising 32 sectors (#0 to #31). (91) shows a block structure per one sector comprising 43 blocks (B1 to B43). Each block is consisting of a 2-byte servo field and a successive 16-byte data field and being divided into 32×43=1376 blocks per one track. FIG. 2 shows a pit pattern of the servo field. Pits (92), (94) and (93), (94) are slightly deviated respectively in the opposite direction relative to axes of the track centers (97), (98). Tracking sensor signal can be obtained only from these pairs of pits (called a pair of wobbled pits). Such a servo system is called a sampled servo type whose operation principle is described, for example, in SPIE, Vol. 529, Third International Conference on Optical Mass Data Storage (1985), Page 140, so that it will be omitted here. In such prior art optical disc system, since the tracking sensor signal can be obtained only from the pair of pits in the servo field, guide grooves for tracking are not necessary. Accordingly, in order to access quickly from the present track to a certain object track, as shown in FIG. 2, the servo field structures A, B are arranged alternately at every 16 tracks so that the track quantity passed during the high speed access can be counted. In FIG. 2, the track number is given as follows, track number = $I+(N-1)\times 16$ where, I = 1, 2, 3 . . . 16. In the servo field structure A, N = 1,3,5, . . . , and in the servo field structure B, N = 2,4,6, . . . . In the servo field structures A and B, the position of one pit (92) of a pair of pits is shifted toward the track from the other pit (93). When accessing as crossing the track diagonally, the track quantity crossed can be obtained by detecting the positions of pits as illustrated in FIG. 3. In the figure, (71) indicates track centers which are present in a number at 1.5 μm intervals. (72) denotes the position of the servo field which is, as shown on the right hand side of the figure, constructed as A, B for every 16 tracks. (73) generally represents a locus of an optical spot at high-speed accessing. A black spot indicated at (74) shows the intersection of the optical spot and the servo field. The servo field structure can be recognized by the black spot (74). (99) denotes a recognized signal wave form, in which an "H" level represents the servo field structure A and an "L" level represents the servo field structure B. It is to be noted that 16 tracks are counted at every change of state of the signal wave form (99), from which the number of tracks crossed during accessing can be counted and the object track can be reached immediately.

In the prior art aforementioned, through it is possible to count the tracks when an optical head is accessed at high speed, as it is clear from FIG. 3, there is such a disadvantage that it can not be detected that whether the optical spot is processing externally or internally with respect to the disc track. As a method for accessing the optical head at high speed, there is the method of taking out the speed detecting signal during accessing from the disc to control the speed of the optical head. This speed control method, when compared to the conventional method in which a glass scale is provided at the outer portion to control the speed thereby, has such advantages as eliminating the glass scale, reducing the unit size and moderating the machine accuracy. However, when using the conventional optical disc and employing this speed control method, it will be a fatal defect that the direction can not be detected. It is because that, since the seek direction of the optical head which may reverse during the speed control can not be detected, the control loop makes a positive feedback causing the optical head to runaway and collide with an inner or outer stopper to break.

In the aforesaid prior art, through the tracks can be counted up to the high seek speed of 16×track pitch (1.5 μm)/block period (1/30×1/1376 sec.) = 1.0 m/sec. at disc revolutions of 1800 r.p.m., as the servo field structure is changed at every 16 tracks, on the other hand, a fine count under 16 tracks is not possible. Therefore, when the remained track quantity approaches to 16, the other low speed track count technique must be used, greatly hindering the reduction of access time due to the low speed. The low speed track count technique as referred to herein is a method for counting from the number of tracks crossed by the tracking sensor signal of the sampled servo as the maximum detecting limit speed of track pitch/block period = 61.9 mm/sec.

Furthermore, when controlling the speed by taking out the speed detecting signal from the disc during accessing, since the speed signal can be detected only after moving by 16 tracks, and idle time of a speed detector is lengthened and a speed control system becomes unstable, making the wide-band high-speed speed control impossible.

SUMMARY OF THE INVENTION

The present invention has been devised to solve the aforesaid problems, therefore, it is a primary object of the present invention to provide an optical disc and its driving apparatus capable of detecting the seek direction and speed of an optical head when seeking an object track, by dividing a sector block of the optical disc into two parts and preformatting pits whose positions are displaced respectively in a predetermined order.

It is another object of the present invention to provide an optical disc and its driving apparatus capable of detecting the seek direction and speed of an optical head as well as controlling the seek speed thereof when seeking an object track, by preformatting wobbled pits of a pattern in which a code having two significant digits in K digits is repeated every N tracks cyclically, and the significant digit of either of adjoining tracks is shifted by one digit.

It is a further object of the present invention to provide an optical disc and its driving apparatus capable of detecting the seek direction and speed of an optical head as well as controlling the seek speed thereof when seeking an object track, by preformatting address pits of a pattern in which a code having two significant digits in K digits is repeated every N tracks cyclically, and the significant digit of either of adjoining tracks is shifted by one digit.

The above and further objects and features of the invention will more fully be apparent from the following detailed description with accompanying drawings.

BRIEF DESCRIPTION OF THE DRAWINGS

FIG. 11 is the number of codes of a pit pattern of an optical disc of the present invention, FIG. 18 is the number of codes of a pit pattern of an optical disc of the fifth invention.

DESCRIPTION OF THE PREFERRED EMBODIMENTS

Figure 4A:
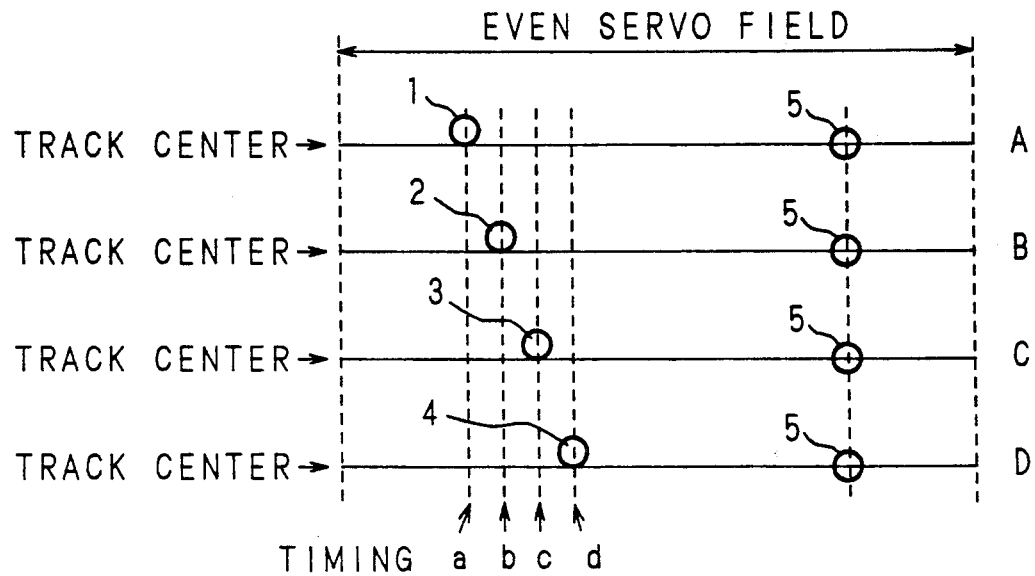
FIGS. 4(a) and 4(b) are pattern configuration diagrams showing a first embodiment of a pit pattern of an optical disc of the first invention.
Figure 4B:
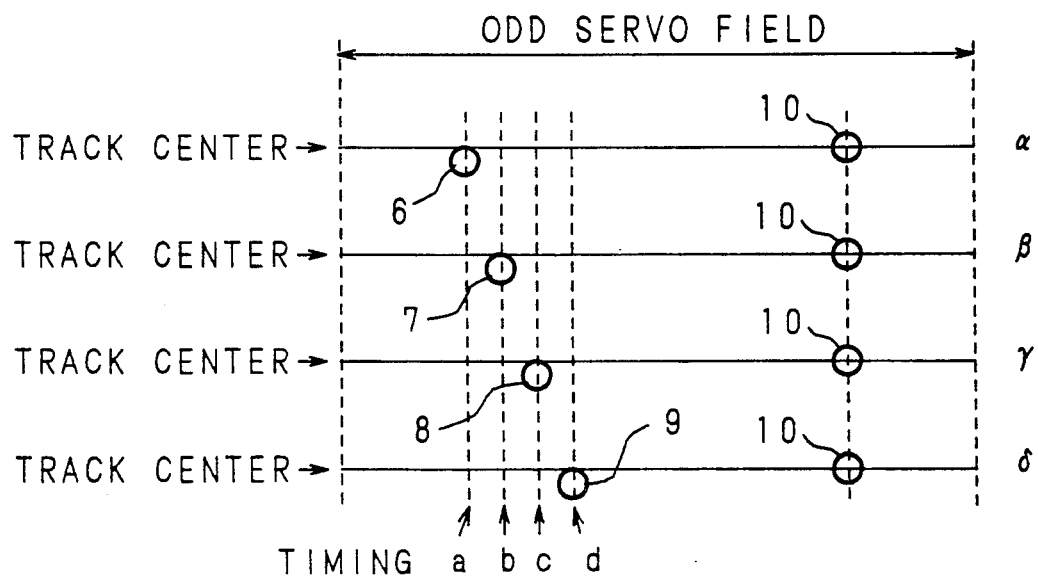

FIGS. 4(a) and 4(b) show a first embodiment of an optical disc of the first invention, in which even and odd servo field pit patterns are shown. In the FIGS. (1), (2), (3) and (4) of the even servo field and (6), (7), (8) and (9) of the odd servo field constitute pairs of wobbled pits, and in the same way as the prior art, respective pits are slightly deviated from the track center axes. Clock pits (5), (10) are arranged on the track center axes and serve as the clock reference of recorded information data as well as the sampling pulse generating reference of the wobbled pits. Assume that the timing positions on the basis of clock pits (5) and (10) of the wobbled pits (1) and (6), (2) and (7), (3) and (8), (4) and (9) are respectively a, b, c, d, and as shown in the figures, that the servo field structure having the pit at the timing position a is A or $\alpha$, and similarly at b is B or $\beta$, at c is C or $\gamma$ and at d is D or $\delta$.

Figure 1:
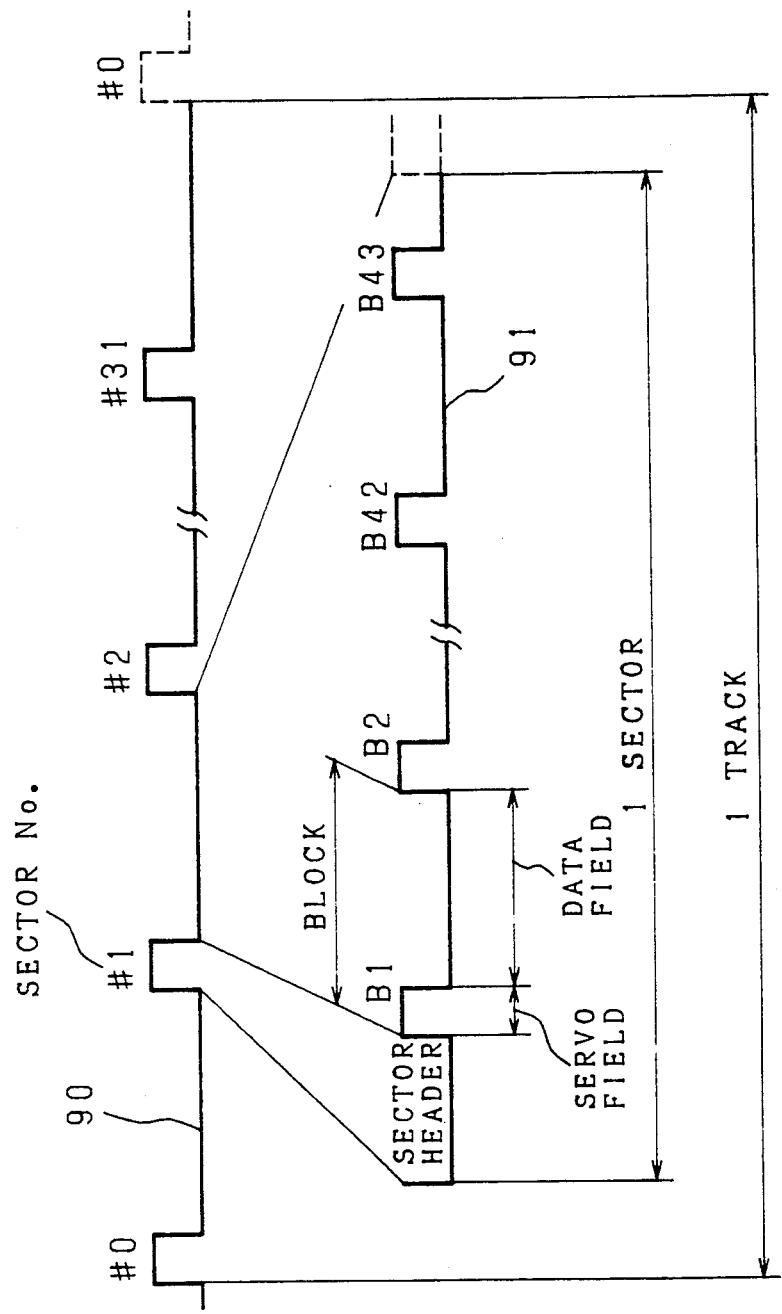
FIG. 1 is an explanatory view showing a track sector format of a conventional optical disc.
Figure 2:
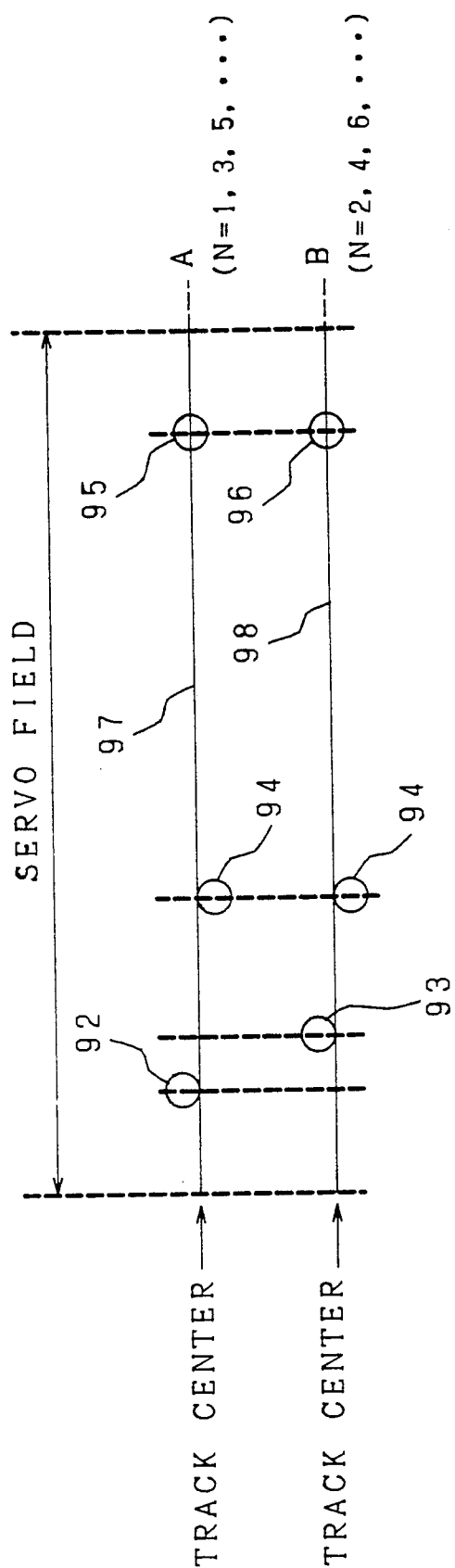
FIG. 2 is a pit pattern configuration diagram of a conventional optical disc.
Figure 5:
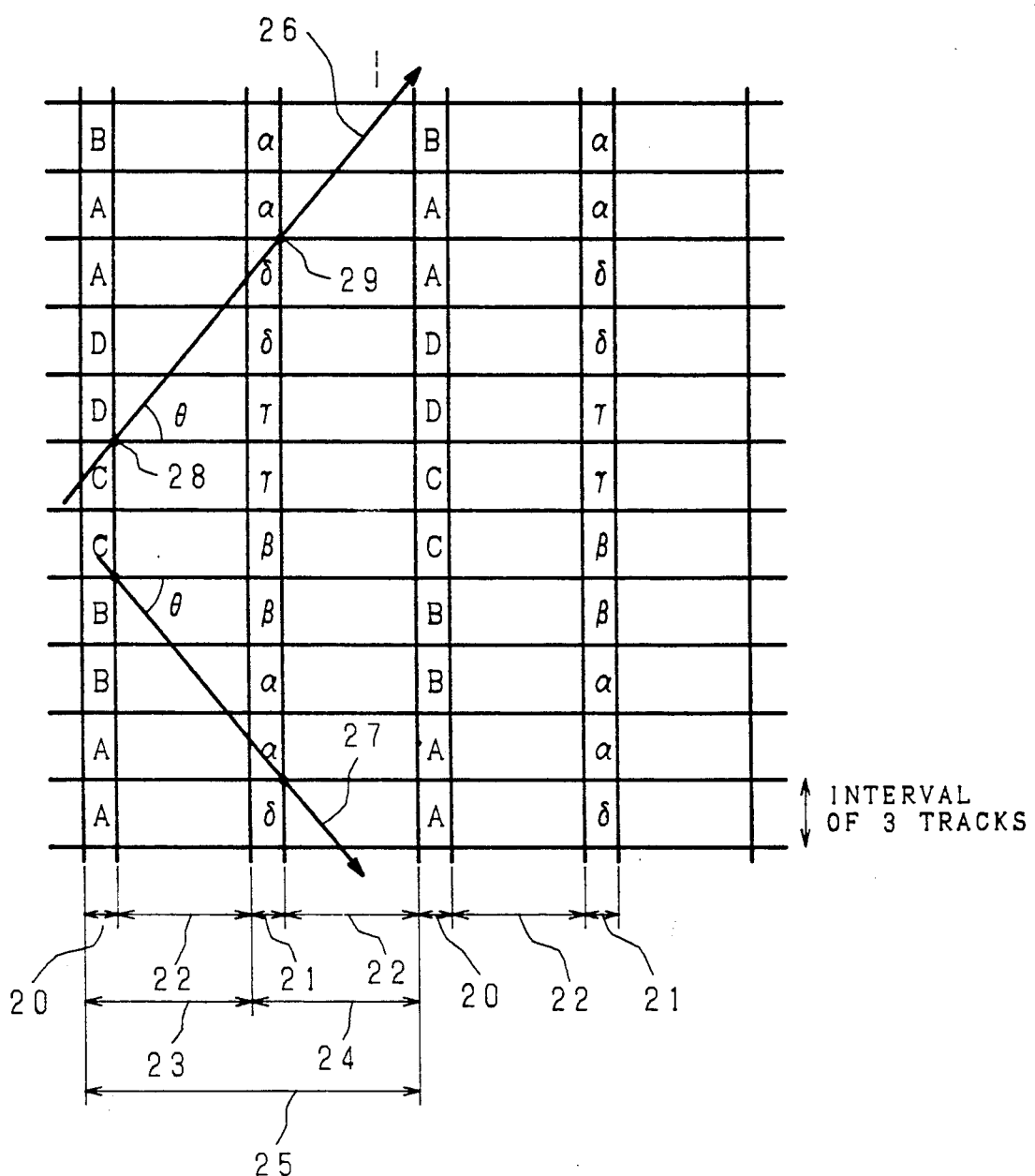
FIG. 5 is an explanatory view showing a servo field structure of an optical disc of the first invention and a state of the disc surface being scanned by an optical spot.

FIG. 5 is a view showing the arrangement of servo field patterns shown in FIGS. 4(a) and 4(b) on the disc surface. The numeral (20) indicates the even servo field, (21) denotes the odd servo field and (22) represents a data field. (23) is an even block, (24) is an odd block and (25) is a basic block, which is a basic unit including the even and odd blocks (23), (24) and corresponds to one block of the conventional example shown in FIG. 1. That is, as same as the even block and odd block, the block length is one half of that of the conventional block. (26), (27) indicate loci of the optical disc spot during accessing.

Figure 6:
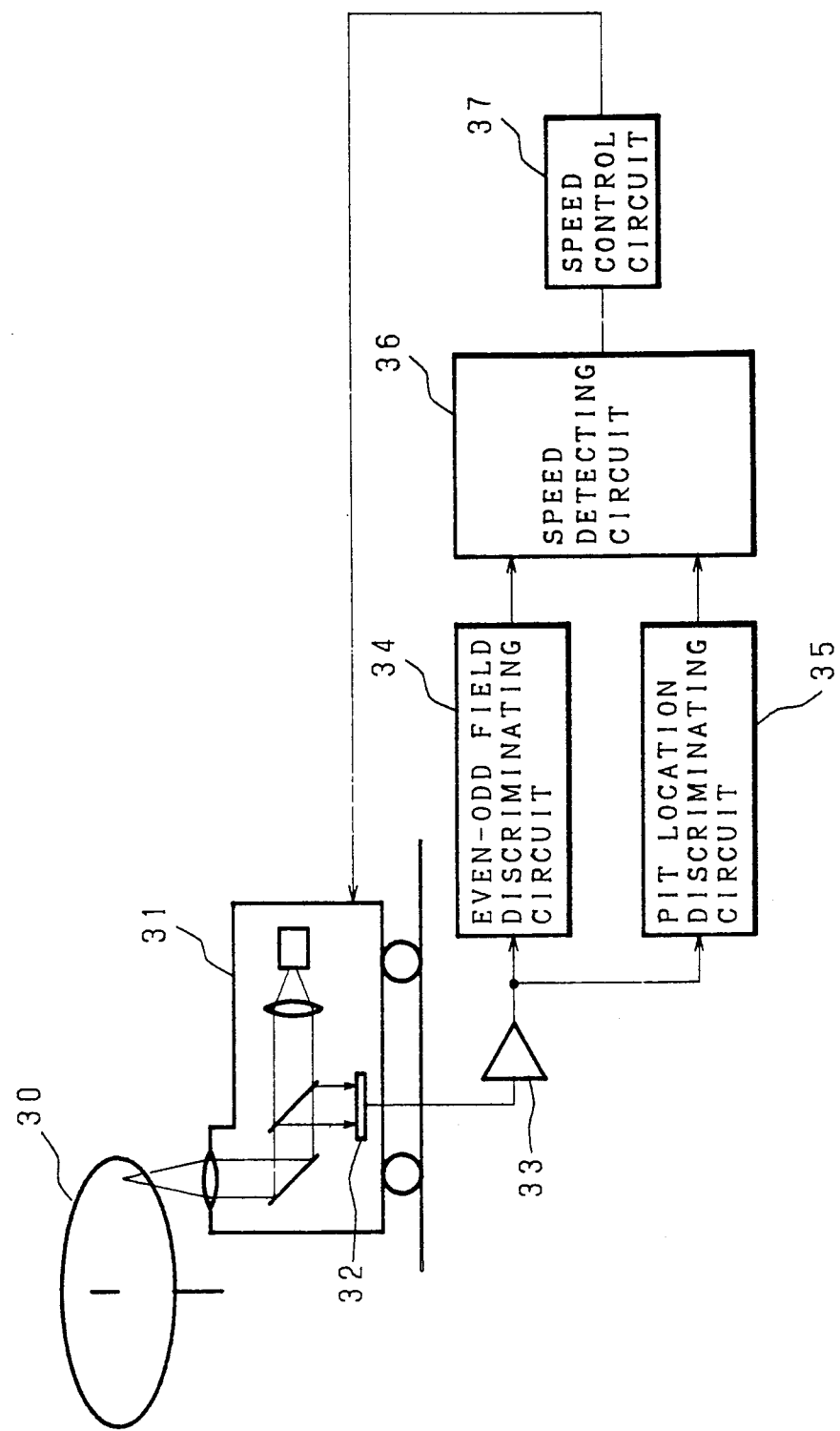
FIG. 6 is a block diagram showing an embodiment of an optical disc driving apparatus of the second invention.

FIG. 6 shows one embodiment of an optical disc driving apparatus of the second invention. The numeral (30) denotes an optical disc of the first invention, underside of which is opposed by an optical head (31) which is movable radially of the optical disc (30) for recording and regenerating information therefrom. (32) is an optical detector for detecting information from the optical disc (30), and the detected information is given to a pre-amplifier (33) which is connected to the optical detector (32) and converts the current into the voltage. The output signal from the pre-amplifier (33) is given respectively to an even-odd field discriminating circuit (34) and a pit location discriminating circuit (35), and respective discriminated results are given to a speed detecting circuit (36) which detects the radial speed and seek direction of the optical head (31) relative to the optical disc (30). (37) denotes a speed control circuit for controlling the speed of the optical head (31) by the output of the speed detecting circuit (36) to access an object track.

In the following, operations of an optical disc of the first invention and an optical disc driving apparatus of the second invention will be described together.

As shown in FIG. 5, since a pair of wobbled pits are detected naturally by a pair of even and odd servo fields to give the tracking sensor signal, it will be omitted.

Figure 3:
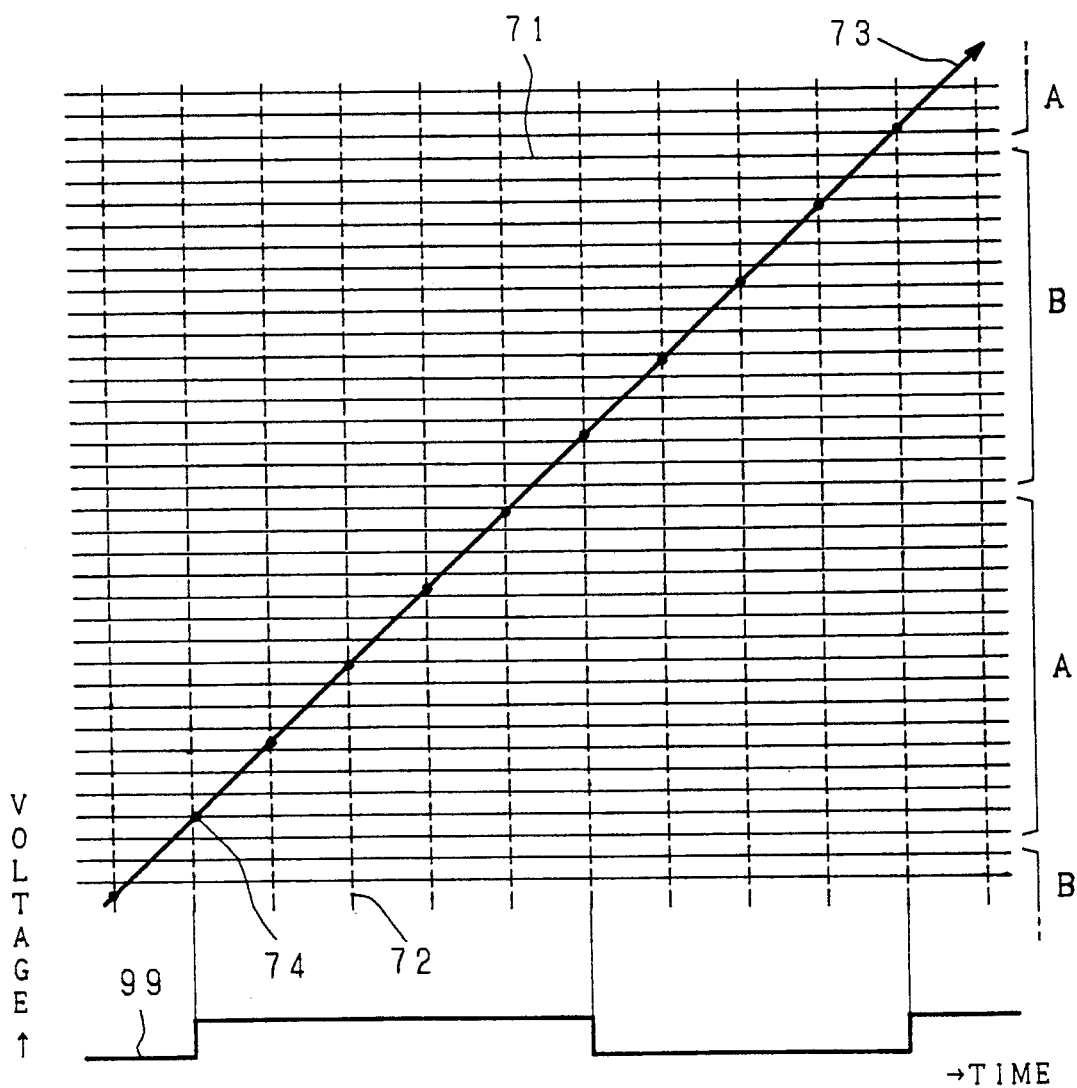
FIG. 3 is an explanatory view showing a servo field structure of a conventional optical disc, and a state of the disc surface being scanned by an optical spot.

FIG. 5 shows the state of the servo field structure arranged on the disc surface being scanned by an optical spot. In the same way as FIG. 3, tracks are aligned at 1.5 μm pitches and the numeral (26) or (27) represents a locus of the optical spot accessing at high speed. In FIG. 5, as shown in the figure, the servo field structure is an iterative structure of AABBCCDD for every 3 tracks in the even servo field, and in the odd servo field, it is an iterative structure of $\alpha\alpha\beta\beta\gamma\gamma\delta\delta$ by offsetting 3 tracks with respect to the even servo field. The track locus (26) shows the case wherein the optical spot is moving upwardly in the figure at maximum detectable speed, detecting C at a black spot (28) and δ at a block point (29) in the odd field which is the next servo field. In FIG. 6, for example, from the sector header signal of the signal which has been detected from the disc and converted into the electric signal by the pre-amplifier (33), whether the field is even field or odd one is discriminated by the even-odd field discriminating circuit (34). In the pit location discriminating circuit (35), the reflected signal level from the disc is sampled by the sampling signal of the timing locations a, b, c, d made from the clock pit to discriminate the pit location by obtaining the timing location in which a maximum signal level can be obtained. It is to be understood that ABCD $\alpha\beta\gamma\delta$ can be specified by the pit location and whether the field is even field or odd one. In FIG. 5, the radial seek speed of the spot locus (26) is represented by, block seek speed $\times \tan\theta$. The spot locus (27) shows the case wherein the optical spot is moving downwardly at maximum speed, and in this case, α is detected after C. The seek speed in this case is represented by, block seek speed $\times \tan(\theta)$. All cases are involved within $\pm\theta$. The upper limit speed, 1.5 μm$\times 9/(1/30 \times 1/1376 \times 1/2) = 1.1$ m/sec., is approximately as same as the conventional one. When the speed is below this value, it falls within one period from α to δ in the next servo field starting from C, so that the location is decided uniquely as well as the seek direction. In the speed detecting circuit (36), for example, if α appears after C, the speed is detected as the one to have moved 3 tracks upward in the block seek time. When the optical head (31) moves to the even servo field from the odd servo field, for example, if D appears after γ, the speed is detected as the one to have moved 3 tracks upward in the block seek time. The speed signal thus detected is compared with the speed reference signal which changes responsive to the remaining number of tracks by the speed control circuit (37) to control the access speed of the optical head (31) so as to correspond to the speed reference.

Though the speed can be detected only at every 16 tracks in the conventional optical disc, since the arrangement of servo patterns is decided independently in the even and odd servo fields respectively as is the case of the embodiment aforementioned, a very fine speed detection is possible, and as it will be apparent from FIG. 5, since the speed is detected at every 3 tracks, an idle time of the speed detecting circuit can be shortened and stability of the speed control system is increased. Also, the track count is possible for every 3 tracks, enabling the fine counting. Since the speed detecting circuit is for substantially detecting the speed and seek direction, the speed control system never becomes a positive feedback and the stable control is possible even when the accessing direction is reversed during the speed control.

Figure 4C:
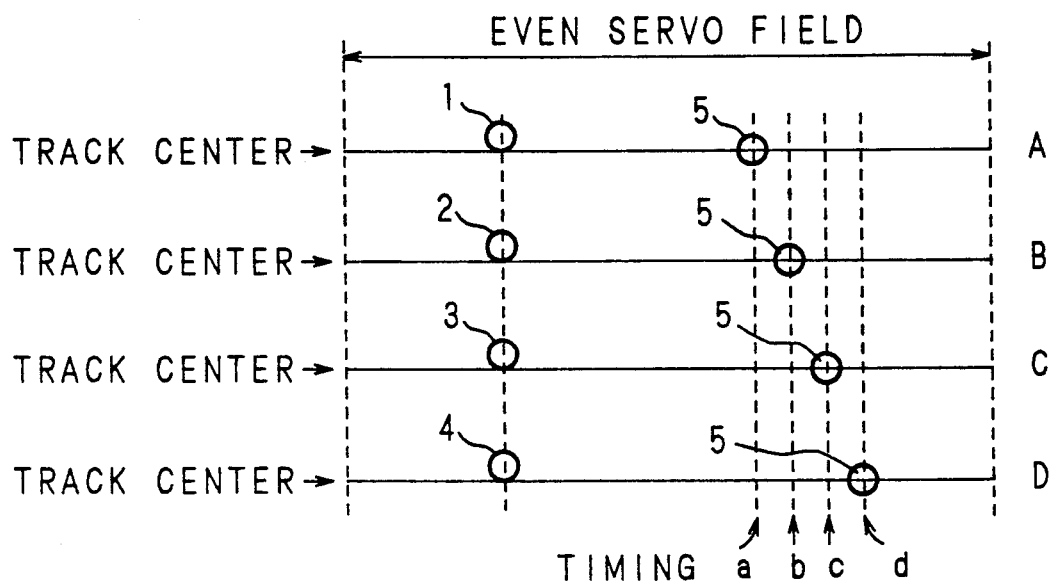
FIGS. 4(c) and 4(d) are pattern configuration diagrams showing a second embodiment of a pit pattern of an optical disc of the first invention.
Figure 4D:
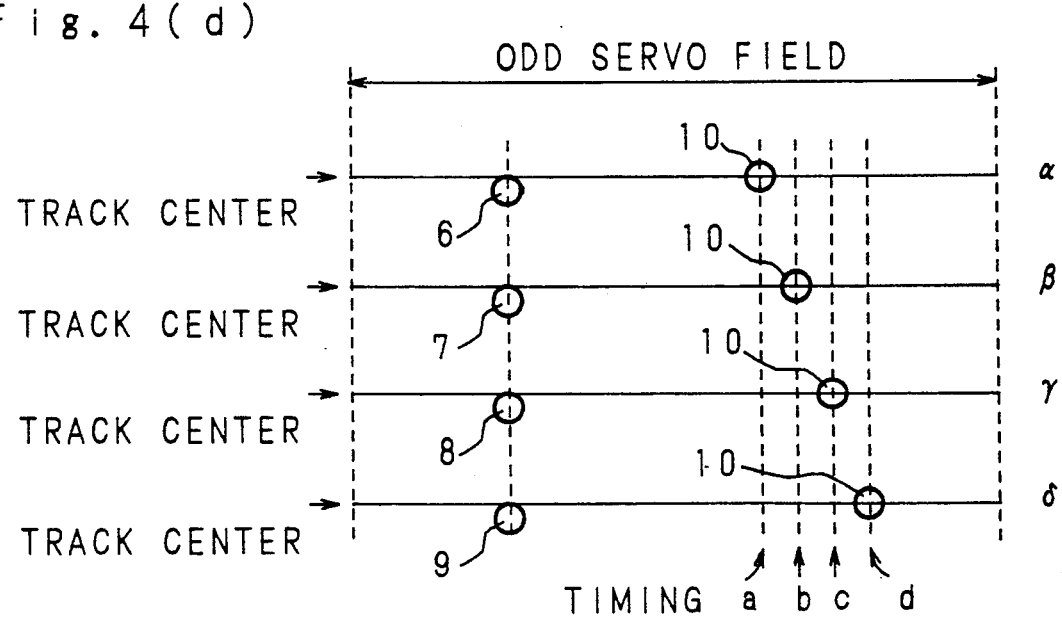

In the optical disc of the aforesaid embodiment of the first embodiment, though various servo field patterns were constructed by shifting the location of wobbled pits, as shown in FIGS. 4(c) and 4(d), the servo field pattern may be constructed by arranging not the wobbled pits (1), (6) to (4), (9), but the independent access pits (5), (10) for access control periodically on a plurality of access pit locations a, b, c, d on the track center axes. The access pit may be pluralized and coded. In the case of FIGS. 4(c) and 4(d), it is also possible for the wobbled pits (1), (6) to (4), (9) to function commonly as the reference pits for timing. In the servo field structure shown in FIG. 5, though the 3-track offset was provided in the cyclic structure of the even and odd servo fields, it is not inevitable.

Likewise, though the number of timing positions was described as four, it is not limited thereto, any number above two will do as the seek direction can be detected if it is more than two. The more the number is, the more increases the maximum detecting speed. The number of tracks of the same servo pattern was also explained as three, but any number above one will do. The less the number is, the more increases the resolving-power, shortening the idle speed detecting time and increasing the stability.

In the embodiment aforementioned, through accessing the entire optical head has been explained, in the case of separate type optical head, it will be understood that it is also applicable when accessing a portion of optical head.

Furthermore, the optical disc comprising any of the following types will do, a write-once type, an erasable type including an magneto-optical disc and a read only type including a compact disc.

As described heretofore, in the optical disc of the first invention, it is possible to detect the direction during accessing as well as increasing the resolving-power of the track count. Moreover, in the optical disc driving apparatus of the second invention, it is possible to detect the speed and direction from the information track using the optical disc of the first invention to control the speed for accessing, and to make the apparatus smaller.

Next, the third invention will be described.

Figure 7A:
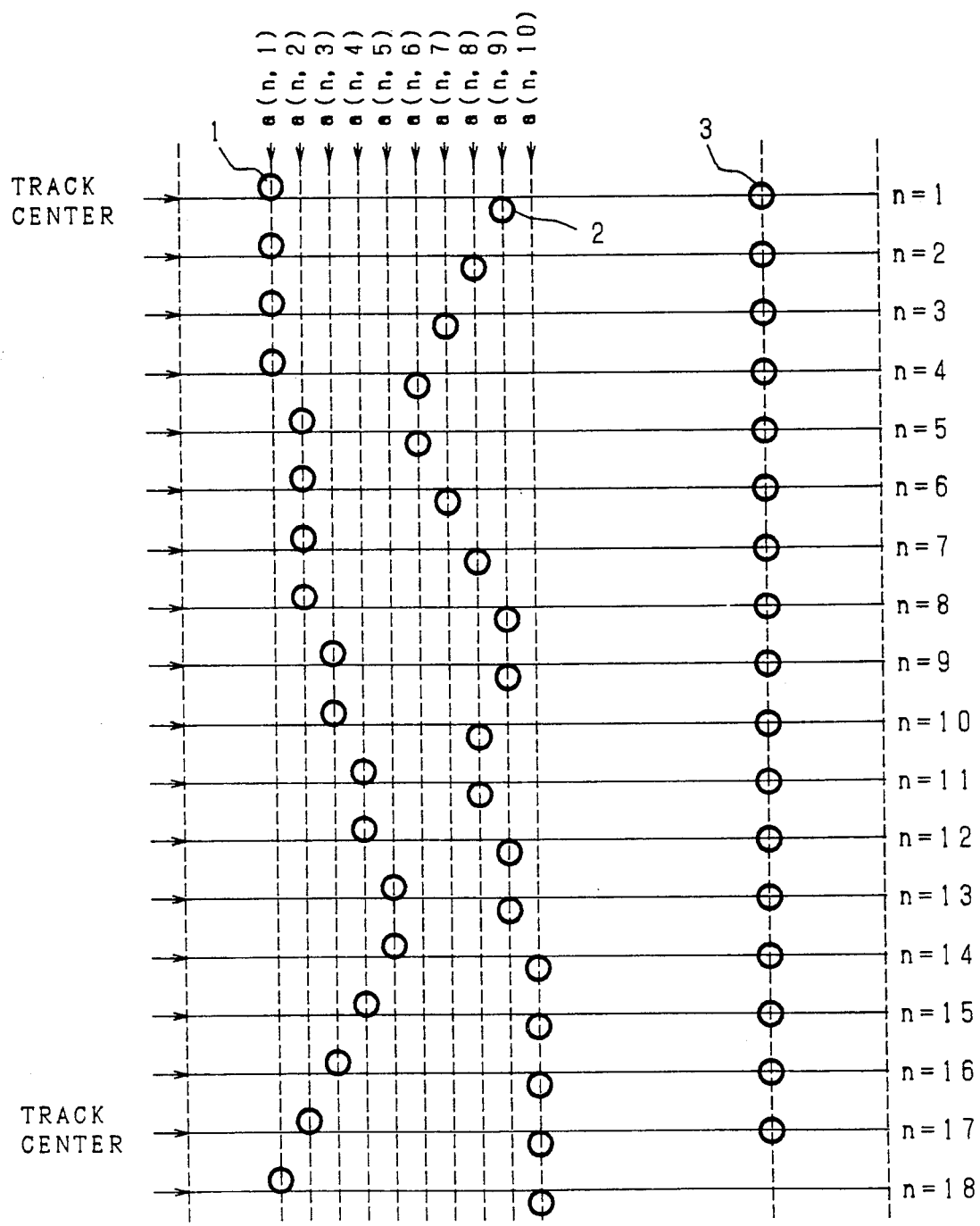
FIG. 7(a) is a pattern configuration diagram showing a first embodiment of a pit pattern of an optical disc of the third invention, FIGS. 7(b) and (c) are pit pattern configuration diagrams showing second and third embodiments of a pit pattern of an optical disc of the third invention.

FIG. 7(a) is a view showing the first embodiment of an optical disc of the third invention, in which pit patterns of servo fields are shown. In the figure, (1) and (2) respectively constitutes pairs of wobbled pits, and as same as the prior art, the pits of respective pairs are deviated slightly from the track center axes. Wobbled pit patterns of respective tracks are represented by a code Dn (n=1 to 18) indicated at {A(n,1), A(n,2) ... A(n10)}, and the digit location of the wobbled pits of each Dn shows logic "1". Recording and regenerating clocks, as same as the prior art, generate clocks synchronizing with respective digits by a PLL (Phase Locked Loop) circuit by using the detect signal of the clock pits (3) generated at a constant period as the comparison signal. In the figure, the code Dn changes at every track and becomes a cyclic code at every 18 tracks. In each Dn, in the digits of A(n,1) to A(n,5) and A(n,6) to A(n,10), "1" is present by one and "0" digit therebetween is present by three or more. As features of Dn+1 and Dn−1 adjacent to Dn, one "1" digit is in the same location and the other "1" digit is in the location shifted by 1 bit. In FIG. 7(b), the number of composing digits of Dn is 12, and it is in such a pattern that, in each Dn, "1" is always present by one in the first 6 bits and the latter 6 bits. In this case, the number of patterns is 28. FIG. 7(c) shows another example wherein the composing digits are 12.

Figure 8:
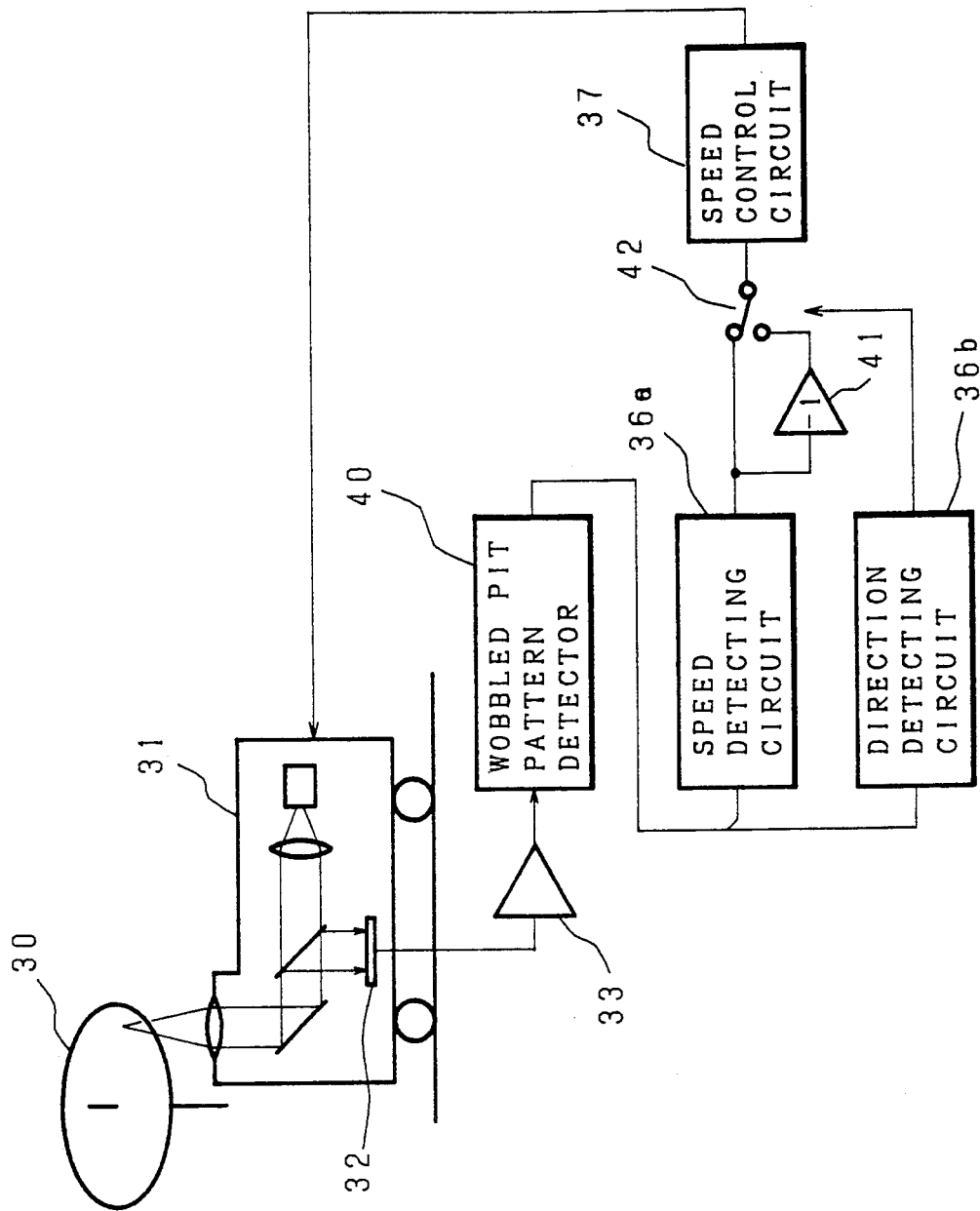
FIG. 8 is a block diagram showing one embodiment of an optical disc driving apparatus of the fourth invention.
Figure 9A:
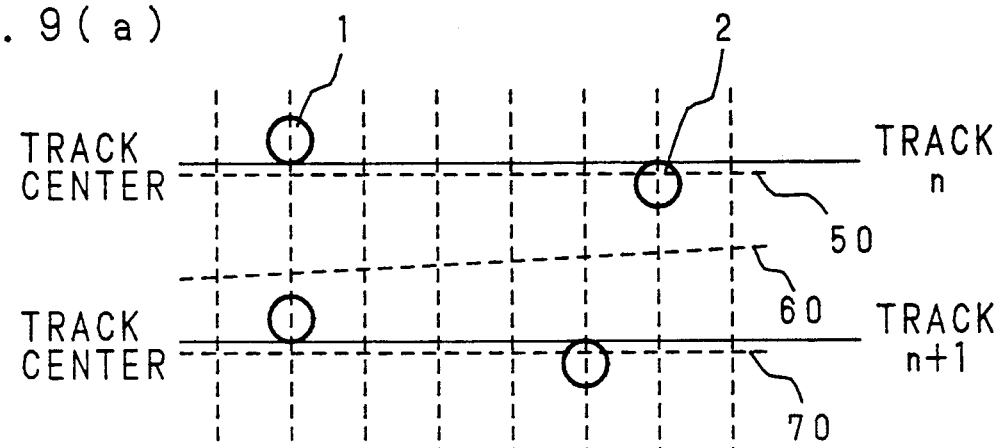
FIGS. 9(a), 9(b), 9(c) and 9(d) are explanatory views of examples of pit pattern and regenerated signal.
Figure 9B:
Figure 9C:
Figure 9D:

FIG. 8 shows one embodiment of an optical disc driving apparatus of the fourth invention. The numeral (30) indicates an optical disc of the third invention, underside of which is opposed by an optical head (31) which is movable radially of the optical disc (30) to record and regenerate information therefrom. (32) is an optical detector for detecting information from the optical disc (30), and the detected information is given to a pre-amplifier (33) connected to the optical detector (32) and converting the current into the voltage. The output signal from the pre-amplifier (33) is given to a wobbled pit pattern detector (40), and the output signal of the pattern detector is given to a speed detecting circuit (36a) for detecting the radial speed of the optical head (31) relative to the optical disc (30) from the relative track address information detected by the pattern detector (40), and a direction detecting circuit (36b) for detecting similarly the radial seek direction (internally or externally) of the optical head (31) relative to the optical disc (30) from the relative track address information. The output of the direction detecting circuit (36b) is given to a switch (42) for switching the signal which is to be transferred to the following step by the output porality of a reversing amplifier circuit (41) and the direction detecting circuit (36b), to the output signal of the speed detecting circuit (36a) or to the output signal of the reversing amplifier circuit (41). The numeral (37) generally indicates a speed control circuit for controlling the speed of the optical head (31) by the output of the switch (42) to access to an object track.

In FIGS. 9, 10 and 11, a composing method and features of a code Dn which is the basis of the third invention will be described. FIG. 9 shows wobbled pits and its regenerating wave forms. FIG. 9(a) shows wobbled pits whose pattern involves features of the code of the third invention. As the necessary condition for the wobbled pit, when the optical head tracks the normal track center, in respective wobbled-pit locations, as the prior art shown in FIG. 1, the track center numbers are recognized and the absolute track address is known. Therefore, the wobbled pit pattern arranged uniquely for the absolute track address can be known and the change of wobbled pit pattern at every track is not inconvenient in any way. Even when the absolute track address is not known, tracking error information can be obtained by converting the regenerated signal in the wobbled pit area into the digital value at respective digit locations by an A/D converter and comparing its upper two sample values. In FIG. 9(a), the regenerated signal of the track n becomes like the signal depicted in FIG. 9(b) and that of the track n+1 becomes like the signal depicted in FIG. 9(d). In the tracking servo, when regenerating the track n, at respective digit locations of A(n,2) and A(n,7), the signal amplitude is obtained by the A/D converter and the tracking servo system may be controlled so as to bring the amplitude values of the two signals equal. On the other hand, during accessing, the optical head passes on the different loci as (50), (60) and (70). When the locus of the optical head is (60), the regenerated signal becomes like the signal depicted in FIG. 9(c). Also in this case, the digit location of "1" in respective Dn patterns must be known. When detecting on the basis of the regenerated signal, in a code arrangement using the code of the third invention, the regenerated signal is subjected to A/D conversion at respective digit locations on the basis of the basis of the adjacent code features to discriminate the two samples as "1" from its maximum value. By this method, when the wave form is as depicted in FIG. 9(c), its discriminating code is discriminated as either the code Dn of the track n or the code Dn+1 of the track n+1, and its detecting capacity can be increased without depending upon the change of regenerated signal level etc. While, "1" of respective codes and the number of digits (run length) of "0" between "1" and "1" are R, the condition $R \geq 3$ is the value considering an intercode interference, and if the intercode interference is permissible, R may be made smaller.

Figures 10A, 10B:
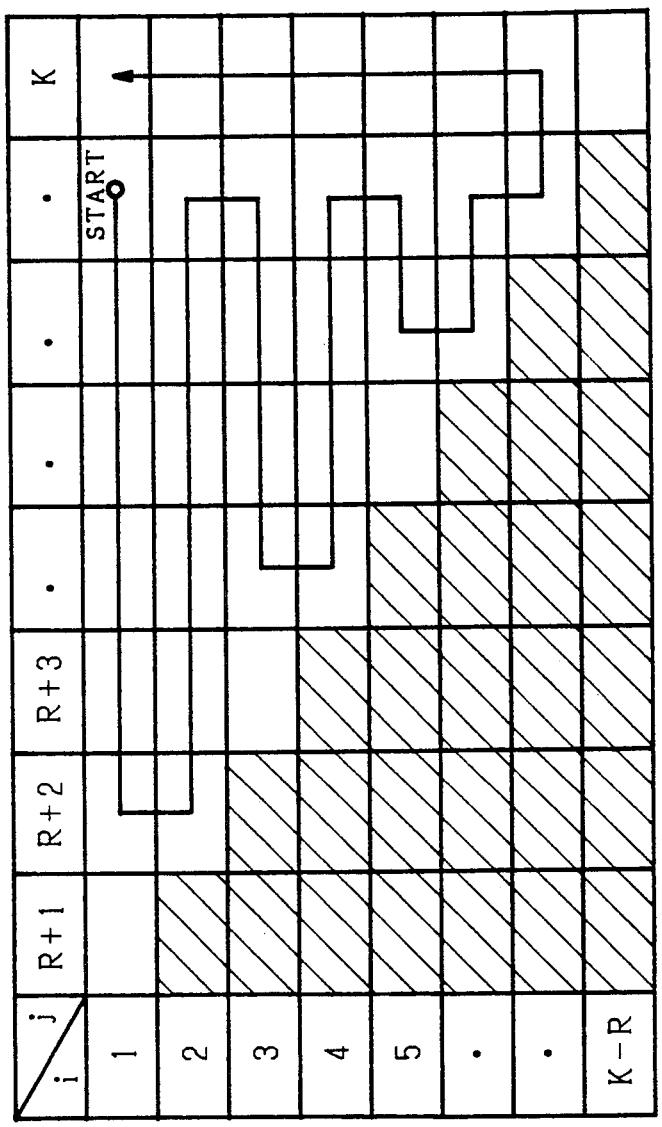
FIG. 10 is an explanatory view of a code configuration of a pit pattern of an optical disc of the present invention.

Next, the cyclic frequencies N, when the digits of code Dn are K and aforesaid R is selected optionally, will be examined. FIG. 10 is an explanatory view and FIG. 11 shows one example thereof. Assume that A(n,i) and A(n,j) in the code Dn shown in FIG. 10(a) have logic "1". At this time, as shown in FIG. 10(b), a lattice of i, 1 to (K−R), and j, (r+1) to K, is considered, where (K−R)>2. The lattice outside the shaded portion is a pattern which satisfies run length$\geq$R. A method of generating the code Dn of the third invention is the method, in which all routes starting from any lattice, moving to the lattice shifted in the direction i or j and finally returning to the first lattice position are permitted. However, the same lattice is not allowed to be passed twice. When K and R are given, maximum N is given by the maximum integral value satisfying the following equation.

$$N \leq \binom{\sum_{m=1}^{K-R} m}{} - \frac{K-R}{2}$$

where, K−R>2.

While, Dn is divided equally into the first digits and the latter digits, and the equally divided code in which "1" is present by one is considered. When using this code, the detecting capacity for disc defects etc. is improved more. FIG. 11 shows values which are obtainable by N. FIGS. 11(a) and (b) are the cases wherein R is 3 and 4, and FIGS. 11(c) and (d) are the values when the first half and second half of the Dn are conditioned to be set "1". While, logics for obtaining the relative track number n will be studied after the Dn pattern has been detected. A decoding process is basically possible by using a conversion ROM, but when the input address of the ROM is larger or when a gate array IC is used, hardwares become larger and not practical. The code of FIG. 7(b) is considered as one example of the third invention, and the track number n is obtained by the code sequence. In this case, Dn is given as, Dn={A(n,1), A(n,2), . . . A(n,11), A(n,12)}. Dn is separated into, Dn1={A(n,1), A(n,2), . . . A(n,6)}, and Dn2={A(n,7), A(n,8), . . . A(n,12)}. Locations of digit "1" address in respective codes are at 0 to 5, and its address values are represented by binary 3 bits as follows.

$$V1 = y0 + 2*y1 + 4*y2$$

$$V2 = z0 + 2*z1 + 4*z2$$

Also, parameters are given as follows.

$$P0 = y0$$

$$P1 = y0 * \overline{y1} * \overline{y2}$$

$$P2 = \overline{y0} * y1 * \overline{y2}$$

$$P3 = y0 * y1 * \overline{y2}$$

$$P4 = \overline{y0} * \overline{y1} * y2$$

$$P5 = y0 * \overline{y1} * y2$$

$$P6 = z0 * \overline{z1} * z2$$

$$V1^* = 5 - V1$$

$$V2^* = 5 - V2$$

Address number n is represented by the following equation.

$$n = \overline{P6} * (V1 + P0 * V2 + \overline{P0} * V2^* + P1 * 5 + P2 * 8 + P3 * 11 + P4 * 14 + P5 * 13) + P6 * (13 + V2^* + V1^*)$$

Figure 12:
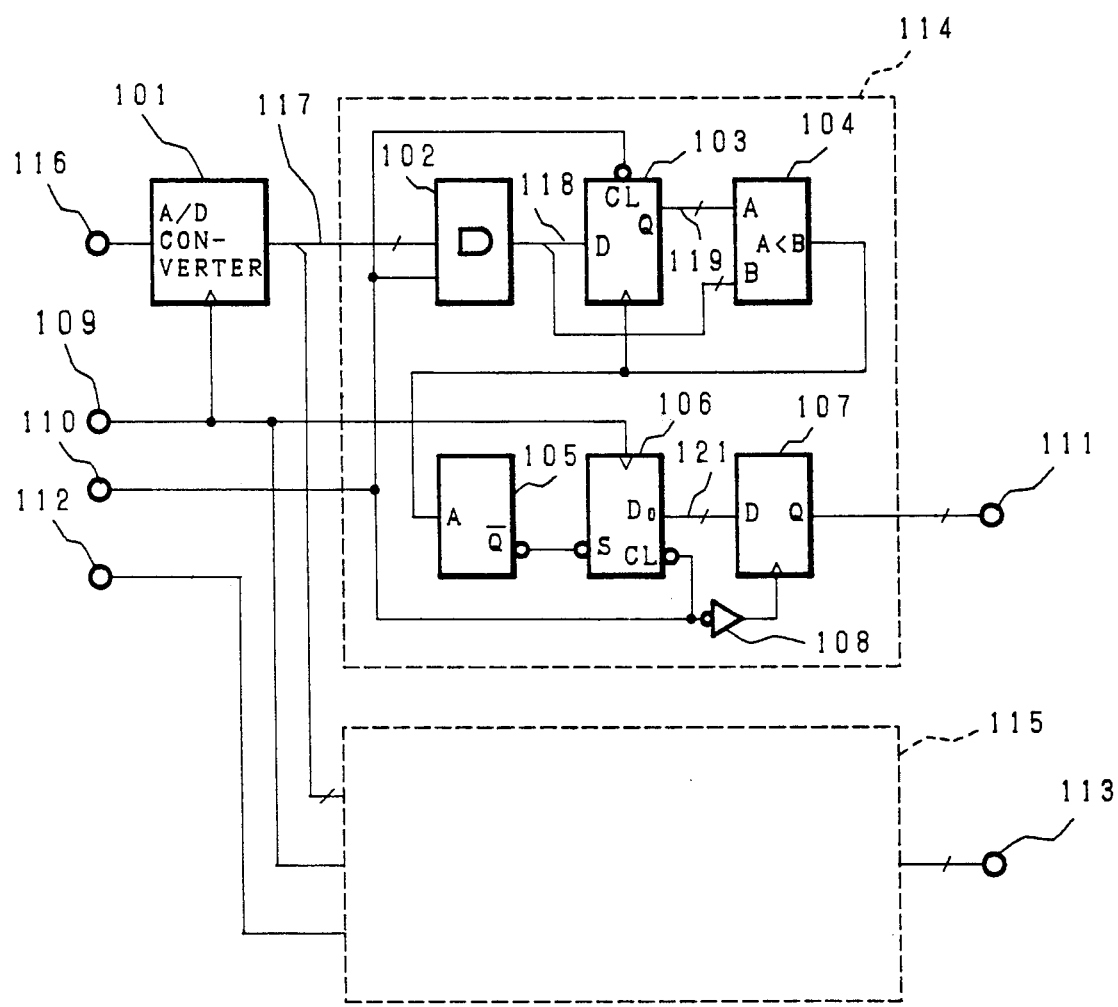
FIG. 12 is a circuit diagram showing a specific embodiment of a wobbled pit pattern detector shown in FIG. 8, FIGS. 13(a), 13(b), 13(c), 13(d), 13(e), 13(f), 13(g), 13(h), 13(i), 13(j), 13(k), 13(l) and 13(m) are wave form diagrams for explaining the operation shown in FIG. 12.

FIG. 12 shows a specific embodiment of a wobbled pit pattern detector (40). FIG. 13 is an explanatory view of the wave form. In FIG. 13, the regenerated signal of FIG. 13(c) regenerated from the disc and converted into the voltage signal is inputted to an input terminal (116), and converted into the digital value by an A/D converter (101) at the sampling position of the input clock signal of FIG. 13(d) which is the signal produced from the aforesaid clock pit by a PLL circuit. The digital signal (117) is inputted to first half and second half code pattern detectors (114) and (115). To terminals (110) and (112), separation gate signals of FIGS. 13(e) and 13(f) for detection are inputted. Here, the first half code pattern detector (114) will be described. Now, assuming that the input signal digital value (117) is as shown in FIG. 13(g), the signal (118) value passing through an AND gate (102) becomes as shown in FIG. 13(h). Signals (118) and (119) are then inputted to a comparator (104) via a latching circuit (103). When the signal (118) value becomes larger than the signal (119), the comparator (104) outputs "H" which is to be latched and shifted to the signal (119). In this embodiment, the signal (119) value is as shown in FIG. 13(i). By the latch signal at this time, a one shot multivibrator (105) is driven and a pulse as shown in FIG. 13(j) is produced in its output (120). By this pulse of FIG. 13(j), a counter (106) is set at 4 digits of the pattern (in this case, it has 5 bits and takes the value of 0 to 4, so that 4 is taken), and the value is subtracted by the clock signal of FIG. 13(d) when the pulse is not produced. While, the gate signal of FIG. 13(e) is adapted to be cleared in the area "L", and when it is completed, the counter output signal (121) is latched by a latching circuit (107) and the output signal (122) value becomes 3 as (l), and is outputted to an output terminal (111) in the binary code 3-bit signal. Similarly, also a code representing the second half pit location is outputted to an output terminal (113) as a value 2 at the timing signal of FIG. 13(m). This signal output is processed by an algorithmic logic circuit for obtaining the aforesaid track number to produce the relative track address in a binary code. The speed detector (36a) and the direction detecting circuit (36b) shown in FIG. 8, utilizing the change of relative track address during accessing, set its value. For example, the time between the servo sectors is known since the revolving rate is constant, thus the number of tracks passed is known by the difference of relative track address value at that time to calculate the seek distance. The speed can be obtained from the time and distance. It is also possible to find the direction by the change of relative track address value. These discriminations can be processed readily by a microcomputer. In the configuration shown in FIG. 8, when an optical spot or an optical head (31) moves externally, the output of the direction detecting circuit (36b) shows a "H" level and when moving internally, it shows a "L" level. By switching the switch (42) to the speed detecting circuit (36a) when the output polarity of the direction detecting circuit (36b) is at "H", and to the reversing amplifier circuit (41) when at "L", the analog input signal of the speed control circuit (37) becomes a signal having directional information to move, for example, externally when positive and internally when negative. Even when the direction is reversed during accessing in such a way, the speed control system never becomes a positive feedback, enabling the stable control. As described hereinabove, the following advantages are ensured by using the wobbled pit pattern of the third invention.

(1) A detecting capacity of the detecting pattern during accessing is high.

(2) Intercode interference of the detecting pattern is small.

(3) Decoding hardwares of the track number can be composed simply from the detecting pattern.

(4) Direction and speed detections can be effected every sample byte, thus more precise control is possible.

(5) By using 12 bits as the number of code bits of the wobbled pits, the relative track addresses of 28 to 32 can be produced to cope with the high-speed and low-speed seekings.

In the embodiment aforementioned, though the case wherein the entire optical head is accessed has been described, it is to be understood that it is also applicable when a portion of the optical head is accessed as in the case of a separate-type optical head. Any optical disc of a write once type, erasable type including an magneto-optical disc and a read only type including a compact disc will do.

As described heretofore, in the optical disc of the third invention, it is possible to detect the direction during accessing as well as improving the resolving-power of the track count.

Furthermore, in the optical disc driving apparatus of the fourth invention, it is possible to detect the seek speed and direction from the information track to control the speed for accessing using the optical disc of the third invention, and the apparatus can be made smaller.

Next, the fifth invention will be explained.

Figure 14A:
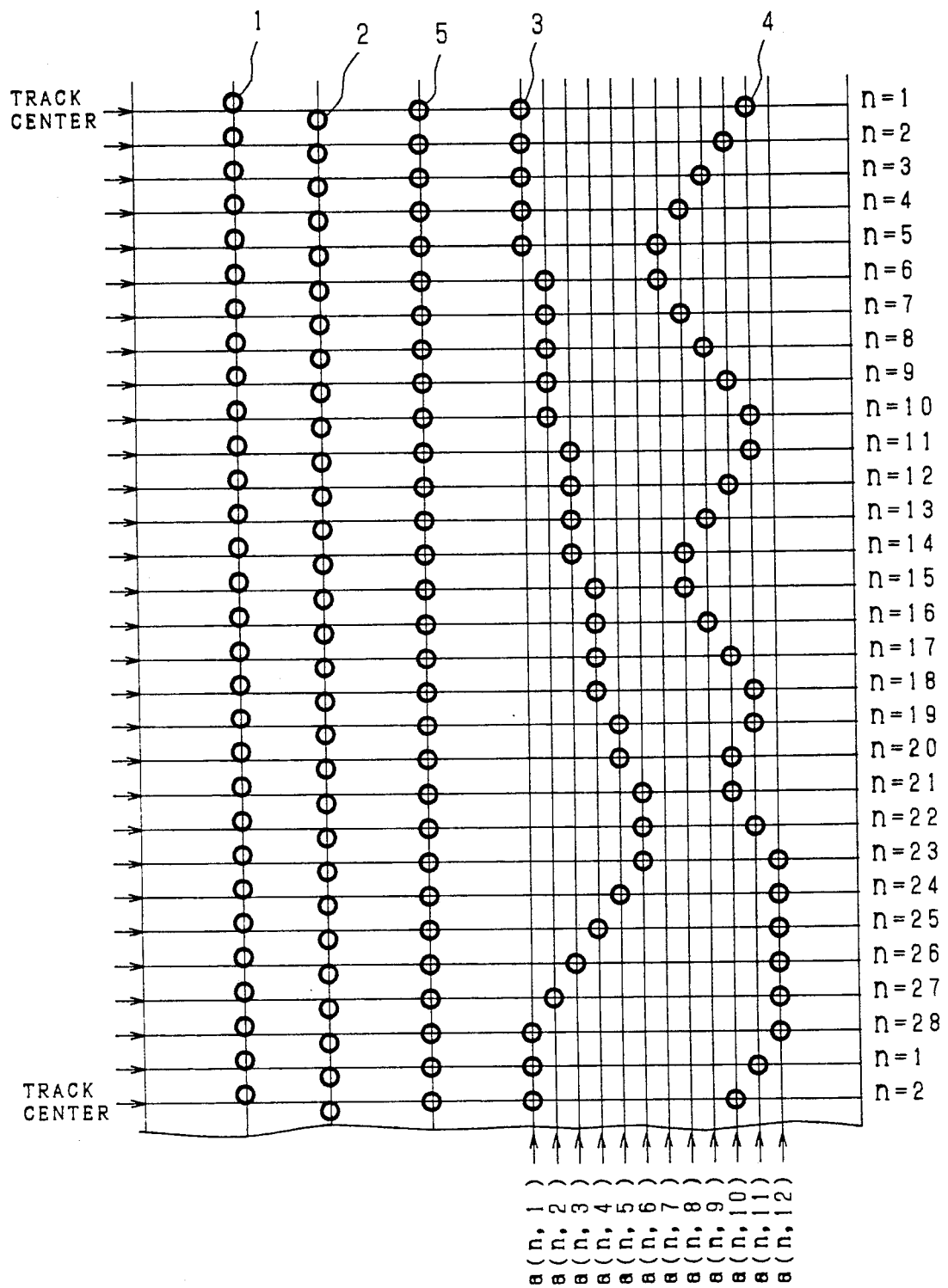
FIG. 14(a) is a pattern configuration diagram showing a first embodiment of a pit pattern of an optical disc of the fifth invention.
Figure 14B:
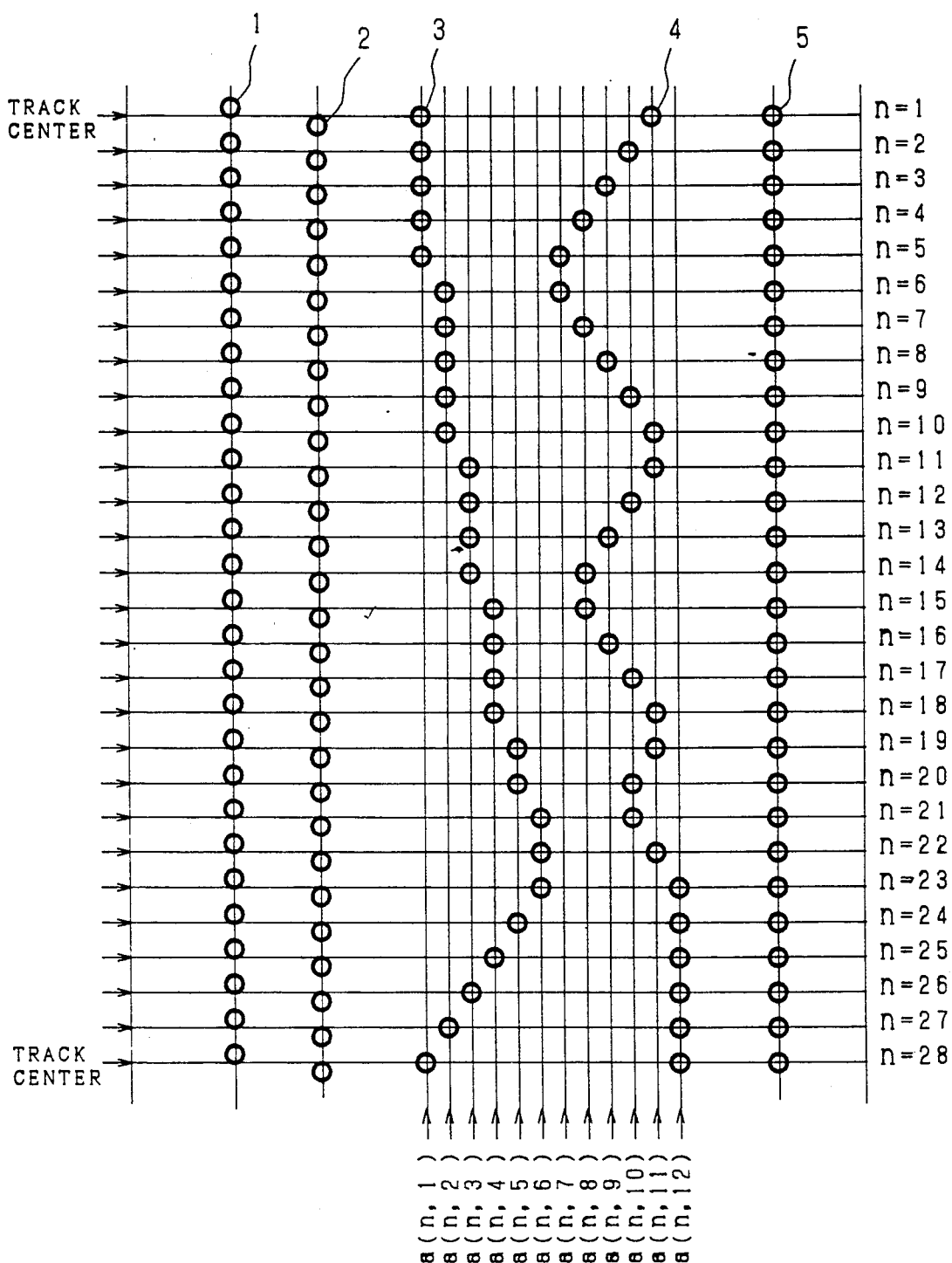
FIG. 14(b) is a pattern configuration diagram showing a second embodiment of a pit pattern of an optical disc of the fifth invention, FIGS. 14(c) and (d) are pit pattern code configuration diagrams showing third and fourth embodiments of a pit pattern code configuration of an optical disc of the fifth invention.

FIG. 14(a) shows a first embodiment of an optical disc of the fifth invention. In the figure, pit patterns of a servo field are shown, and in which (1) and (2) respectively constitute pairs of wobbled pits and as same as the prior art, the pits of respective pairs are deviated slightly from track center axes. (5) indicates clock pits and (3) and (4) are address pits. Address pit patterns in respective tracks can be represented by a code Dn (n=1 to 28) indicated at {A(n,1), A(n,2) ... A(n,12)}, and the digit location of the address pits of each Dn shows logic "1". Recording and regenerating clocks, as same as the prior art, generate clocks synchronizing with respective digits by a PLL (Phase Locked Loop) circuit by using the detecting signal of the clock pits (3) generated at a constant period as the comparison signal. In the figure, the code Dn changes at every track and becomes a cyclic code at every 28 tracks. In each Dn, in the digits of A(n,1) to A(n,6) and A(n,7) to A(n,12), "1" is present by one and "0" digit therebetween is present three or more. As features of Dn+1 and Dn−1 adjacent to Dn, one "1" digit is in the same location and the other "1" digit is in the location shifted by one bit. In FIG. 14(b), the clock pit location and address pit location are different. In FIG. 14(c), the number of composing digits of Dn is 10, and it is in such a pattern that in each Dn, "1" is always present by one in the first 5 bits and the latter 5 bits. In this case, the number of patterns is 18. FIG. 14(d) shows another example wherein the number of digits of the address pattern of the same composition is 12.

Figure 15:
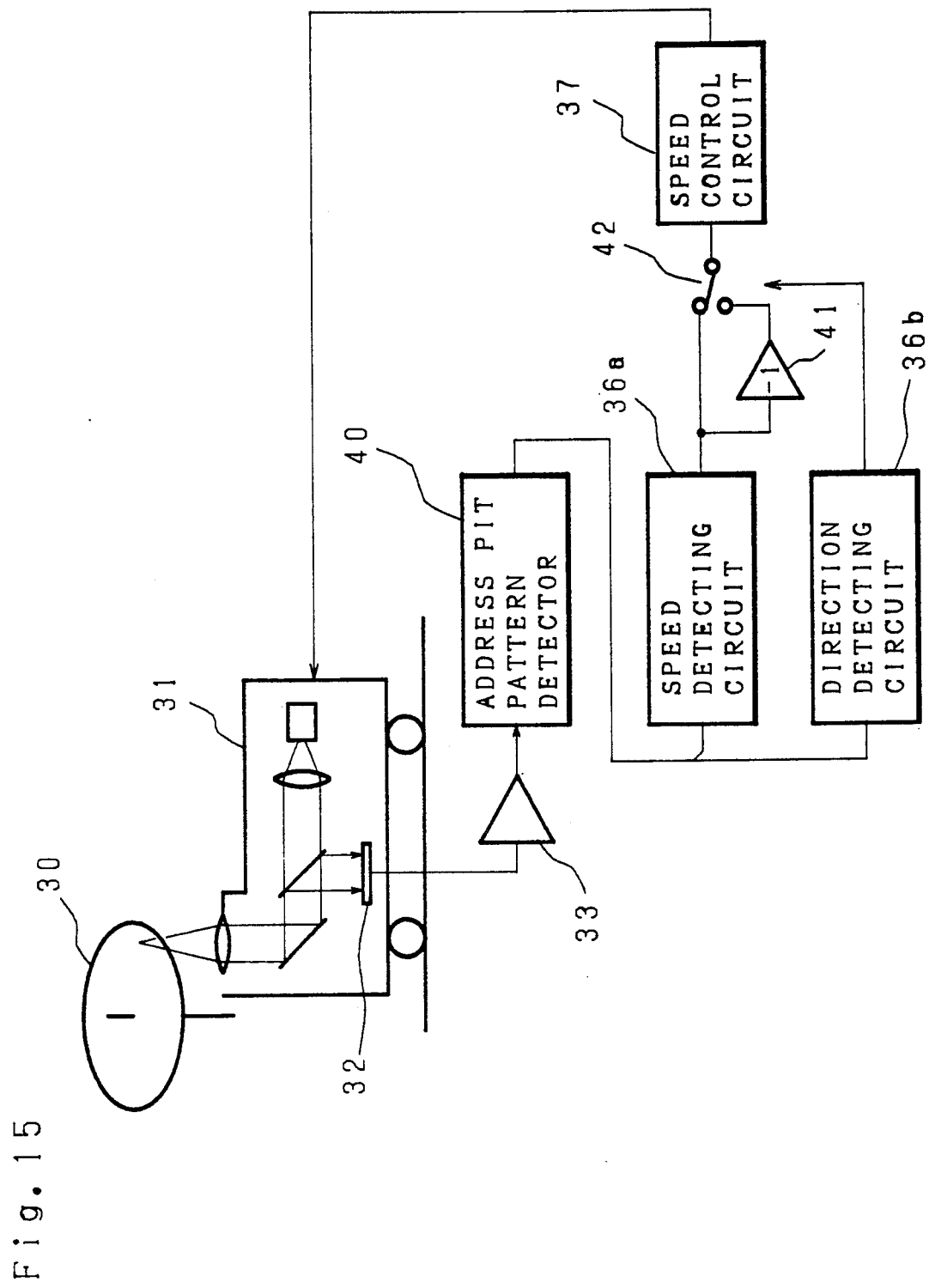
FIG. 15 is a block diagram showing one embodiment of an optical disc driving apparatus of the sixth invention.
Figure 16A:
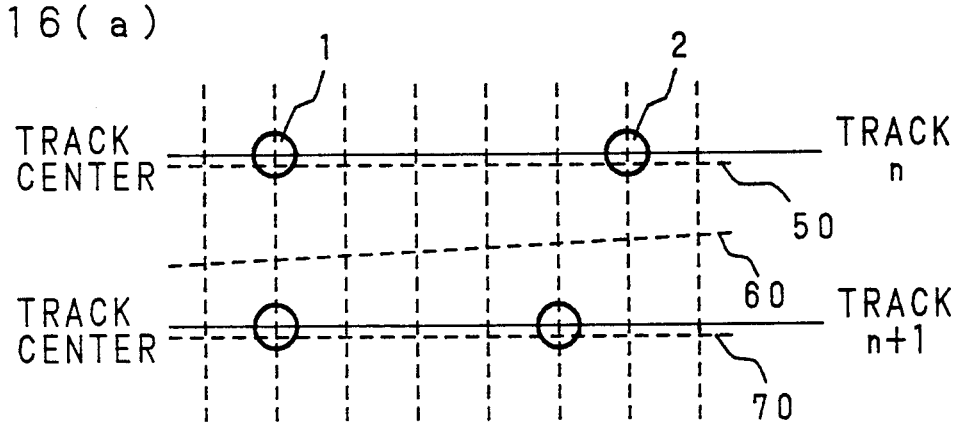
FIGS. 16(a), 16(b), 16(c) and 16(d) are explanatory views of examples of pit pattern and regenerated signal.
Figure 16B:
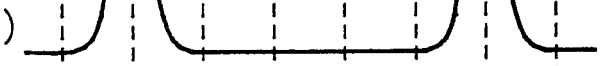
Figure 16C:
Figure 16D:
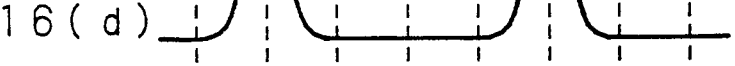

FIG. 15 shows one embodiment of an optical disc driving apparatus of the sixth invention. As the configuration is similar to those shown in FIG. 8, explanation will be omitted.

In FIGS. 16, 17 and 18, a composing method and features of a code Dn which is the basis of the present invention will be described. FIG. 16 shows address pits and its regenerated wave forms. FIG. 16(a) shows the address pits whose pattern involves feathers of the code of the present invention. In the regenerated signal of the address pit portion, the regenerated signal of the track n becomes as depicted in FIG. 16(b) and the regenerated signal of the track n+1 becomes as depicted in FIG. 16(d). During accessing, the optical head passes on the different loci as (50), (60) and (70). When the locus is (60), the regenerated signal becomes as shown in FIG. 16(c). In a code arrangement using the code of the present invention, the regenerated signal is subjected to A/D conversion at respective digit locations on the basis of the adjoining code features to discriminate the two samples as "1" from its maximum value. By this method, when the wave form is as shown in FIG. 16(c), not to mention of the forms depicted in FIGS. 16(b) and 16(d), its discriminating code is discriminated either as the code Dn of the track n or the code Dn+1 of the track n+1, and its detecting capacity can be increased without depending upon the change of regenerated signal level and so on. While, "1" of respective codes and the number of digits (run length) of "0" between "1" and "1" are R, the condition R≧3 is the value considering an intercode interference, and if the intercode interference is permissible, R may be made smaller.

Figures 17A, 17B:
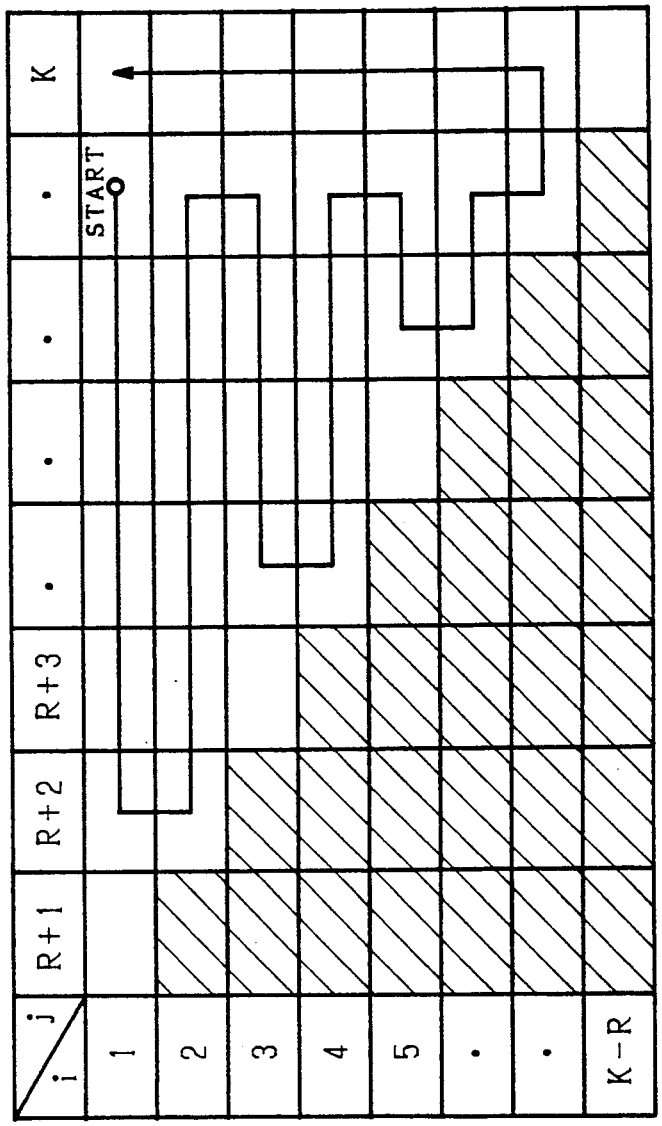
FIG. 17 is an explanatory view of a code configuration of a pit pattern of an optical disc of the fifth invention.

Next, cyclic frequencies N will be examined when the digits of code Dn are K and aforesaid R is selected optionally. FIG. 17 is an explanatory view and FIG. 18 shows one embodiment thereof. Assume that A(n,i) and A(n,j) in the code Dn of FIG. 17(a) have logic "1". At this time, as shown in FIG. 17(b), a lattice of i, 1 to (K−R), and j, (r+1) to K, is taken into consideration, where (K−R)>2. The lattice outside the shaded portion is a pattern which satisfies run length≧R. A method of generating the code Dn of the present invention is the method, in which all routes starting from any lattice, moving to the lattice shifted in the direction i or j and finally returning to the first lattice position are permitted. However, the same lattice is not allowed to be passed twice. When K and R are given, maximum N is given by the maximum integral value satisfying the following equation.

$$N \leq \left( \sum_{m=1}^{K-R} m \right) - \frac{K-R}{2}$$

where, K−R>2.

While, Dn is divided equally into the first digit and the latter digit, and the equally divided code in which "1" is present by one is taken into consideration. When using this code, the detecting capacity for disc defects etc. is improved more. FIG. 18 shows values which are obtainable by N. FIGS. 18(a) and (b) are the cases where R is 3 and 4, and FIG. 18(c) and (d) are the values when the first half and second half of the Dn are conditioned to be set "1". While, logics for obtaining the relative track number n will be studied after the Dn pattern have been detected. A decoding process is basically possible by using a conversion ROM, but when the input address of the ROM is larger or when a gate array IC and the like is used, hardwares become larger and not practical. The code of FIG. 14(a) is considered as one example of the present invention, and the track number n is obtained by the code sequence. In this case, Dn is given as, Dn={A(n,1), A(n,2), . . . A(n,11), A(n,12)}. Dn is separated into, Dn1={A(n,1), A(n,2), . . . A(n,6)}, and Dn2={A(n,7), A(n,8), . . . A(n,12)}. Locations of digit "1" in respective codes are at 0 to 5, and its address values are represented by binary 3 bits as follows.

$$V1 = y0 + 2 \cdot y1 + 4 \cdot y2$$

$$V2 = z0 + 2 \cdot z1 + 4 \cdot z2$$

Also, parameters are given as follows.

$$P0 = y0$$

$$P1 = y0 \cdot \overline{y1} \cdot \overline{y2}$$

$$P2 = \overline{y0} \cdot y1 \cdot \overline{y2}$$

$$P3 = y0 \cdot y1 \cdot \overline{y2}$$

$$P4 = \overline{y0} \cdot \overline{y1} \cdot y2$$

$$P5 = y0 \cdot \overline{y1} \cdot y2$$

$$P6 = z0 \cdot \overline{z1} \cdot z2$$

$$V1^* = 5 - V1$$

$$V2^* = 5 - V2$$

Address number n is represented by the following equation.

$$n = \overline{P6} \cdot (V1 + P0 \cdot V2 + \overline{P0} \cdot V2^* + P1 \cdot 5 + P2 \cdot 8 + P3 \cdot 11 + P4 \cdot 14 + P5 \cdot 13) + P6 \cdot (23 + V2^* + V1^*)$$

Figure 19:
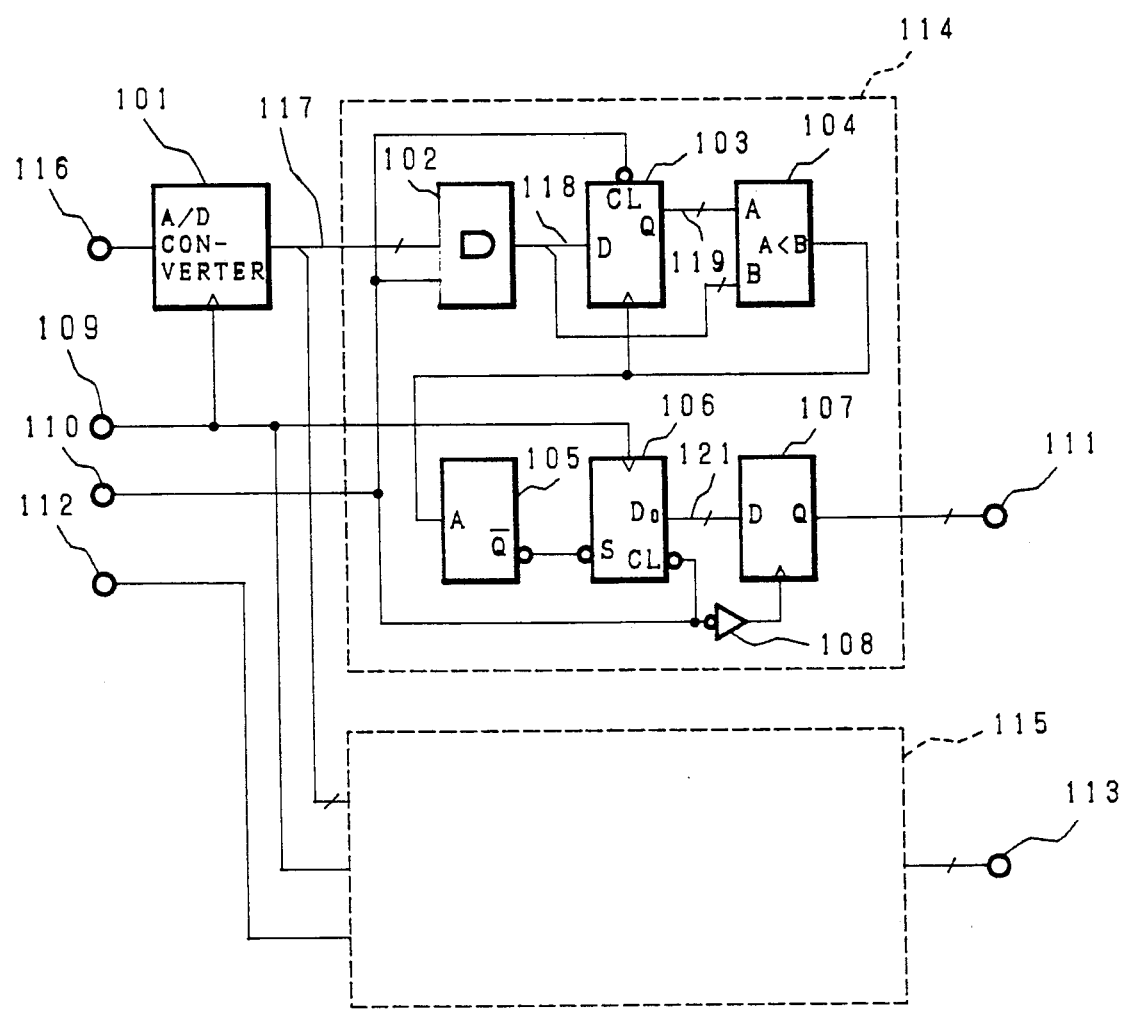
FIG. 19 is a circuit diagram showing a specific embodiment of an address pit pattern detector of FIG. 15, and FIGS. 20(a), 20(b), 20(c), 20(d), 20(e), 20(f), 20(g), 20(h), 20(i), 20(j), 20(k), 20(l) and 20(m) are wave form diagrams for explaining the operation shown in FIG. 19.

FIG. 19 shows a specific embodiment of an address pit pattern detector (40). FIG. 20 is an explanatory view of its wave form. In FIG. 20, the regenerated signal (c) regenerated from the disc and converted into the voltage signal is inputted to an input terminal (116), and converted into the digital value by an A/D converter (101) at the sampling position of the input clock (d) which is the signal produced from the aforesaid clock pit by a PLL circuit. The digital signal (117) is inputted to first half and second half code pattern detectors (114) and (115). To terminals (110) and (112), separation gate signals of FIGS. 20(e) and 20(f) for detection are inputted. Here, the first half code pattern detector (114) will be described. Now, assuming that the input signal digital value (117) is as shown in FIG. 20(g), the signal (118) value passing through an AND gates (102) becomes as shown in FIG. 20(h). Then, signals (118) and (119) are inputted to a comparator (104) via a latching circuit (103). When the signal value (118) becomes larger than the signal (119), the comparator (104) outputs "H", which is latched and shifted to the signal (119). In this embodiment, the signal value (119) is as shown in FIG. 20(i). By the latch signal at this time, a one shot multivibrator (105) is driven and a pulse as shown in FIG. 20(j) is produced in its output (120). By this pulse of FIG. 20(j), a counter (106) is set at 4 digits of the pattern (in this case, it has 5 bits and takes the value of 0 to 4, so that 4 is taken), and the value is subtracted by the clock signal of FIG. 20(d) when the pulse is not produced. While, the gate signal depicted in FIG. 20(e) is adapted to be cleared in the area "L", and when the separation gate signal of FIG. 20(e) is completed, the counter output signal (121) is latched by a latching circuit (107) and the output signal (122) value becomes 3 as shown in FIG. 20(1), and is outputted to an output terminal (111) in the binary code 3 bit signal. Similarly, also a code representing the second half pit location is outputted to the output terminal (111) as a value 2 at the timing point depicted in FIG. 20(m). This signal output is processed by an algorithmic logic circuit for obtaining the aforesaid track number to produce the relative track address in a binary code. The speed detector (36a) and direction detecting circuit (36b) of FIG. 15, utilizing the change of relative track address during accessing, set its value. For example, the time between the servo sectors is known as the revolving rate is constant, thus the number of track passed is known by the difference of relative track address value at that time to calculate the moving distance. The speed can be obtained from the time and distance. It is also possible to find the direction by the change of relative track address value. These discriminations can be processed readily by a microcomputer. In the configuration shown in FIG. 15, when an optical spot or an optical head (30) moves externally, the output of the direction detecting circuit (36b) shows an "H" level, and when moving internally, it shows an "L" level. By switching the switch (42) to the speed detecting circuit (36a) when the output polarity of the direction detecting circuit (36b) is at "H", and to the reversing amplifier circuit (41) when at "L", the analog input signal of the speed control circuit (37) becomes a signal having directional information to move, for example, externally when positive and internally when negative. Even when the direction is reversed during accessing in such a way, the speed control system never becomes a positive feedback, enabling the stable control.

Next, effects of the increased track density will be studied. It has been described already that if the track density is increased, the effects of the adjacent tracks are encountered. An embodiment of FIG. 14(a) will be taken into consideration as a pit pattern arrangement of the servo field of the present invention. In the wobbled pit and clock pit, pit locations of the adjoining tracks are in the same location, thus the unbalanced signal interference to respective pits does not occur as the prior art. Therefore, the tracking performance or detecting performance of the clock pit is not deteriorated. Though the detecting capacity during accessing is the problem for the address pit, as described in conjunction with FIG. 16, it will be apparent that its performance is not deteriorated.

As described heretofore, the following advantages are ensured by using the address pit pattern of the fifth invention.

(1) A detecting capacity of the detecting pattern during accessing is high.

(2) Intercode interference of the detecting pattern is small.

(3) Decoding hardwares of the track number can be composed simply from the detecting pattern.

(4) Direction and speed detections can be effected every sample byte, thus more precise control is possible.

(5) By using 12 bits as the number of code bits of the address pit, the relative track addresses of 28 to 32 can be produced to cope with the high-speed and low-speed seekings.

(6) Tracking and accessing performances are not deteriorated even when the track density is increased.

In the aforesaid embodiment, though the case wherein the entire optical head is accessed has been described, it is to be understood that it is also applicable when a portion of the optical head is accessed as in the case of a separate-type optical head. Any optical disc of a write once type, erasable type including an magneto-optical disc and a read only type including a compact disc will do.

As described hereinabove, in the optical disc of the first invention, it is possible to detect the direction during accessing as well as improving the resolving-power of the track count. In addition, the track density can be increased. Furthermore, in the optical disc driving apparatus of the second invention, it is possible to detect the speed and direction from the information track to control the speed for accessing using the optical disc of the first invention, and the apparatus can be made smaller.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical disc comprising:
 a plurality of tracks positioned radially around said optical disc, said tracks being divided circumferentially in sectors;
 each said track comprising a plurality of basic blocks, each basic block in a track being radially aligned with a basic block in other respective tracks;
 each basic block comprising a first sub-block and a second sub-block;
 each sub-block comprising a servo field and a data field; and
 each servo field comprising:
 a first pit that is positioned at a like position within each servo field;
 a second pit that is positioned at one of a predetermined number of positions within said servo field, positions of said second pits being such that said positions alternate amongst said predetermined positions according to a cyclical sequence along radially aligned servo fields.

2. An optical disc as set forth in claim 1, wherein the servo field of the first sub-block and the servo field of the second sub-block of each basic block together include a pair of wobbled pits for tracking.

3. A driving apparatus of an optical disc, which includes a plurality of circumferential sectors, a plurality of radial tracks, and a basic block provided in each said sector, wherein said basic block includes first and second blocks having a servo field and a data field, respectively, and a first pit that is positioned at a like position within each servo field and a second pit that is positioned at one of a predetermined number of positions within each said servo field, the positions of said second pits being such that said positions alternate amongst said predetermined positions according to a cyclical sequence along radially aligned servo fields, said apparatus comprising:

an optical head, which is movable radially in at least one seek direction over said optical disc at a speed, irradiating an optical spot to said optical disc, and detecting light therefrom to convert it into an electric signal;

area discriminating means for making a determination, using the detected electric signal, whether said block is the first block or the second block;

means for discriminating pit position from said electric signal;

speed detecting means for detecting a seek direction and the speed of said optical head using the determination whether said block is the first block or the second block, a discriminated pit position in a current servo field and a discriminated pit position in a previously crossed servo field; and speed control means for controlling the speed of said optical head responsive to said detected seek direction and speed.

4. An optical disc comprising:

tracks provided concentrically or spirally;

pairs of wobbled pits for tracking, formed at every track circumferentially at a predetermined interval; and clock pits formed at positions spaced from said pairs of wobbled pits for synchronisms formed circumferentially at a predetermined interval, each possible pit position of a pair of wobbled pits on a track encoding a digit of a multiple digit binary code wherein presence of a pit in a position encodes a first binary value for a respective digit in the code and absence of a pit in a position encodes a second binary value for the respective digit in the code, each said multiple digit binary code having two significant digits with insignificant digits therebetween and being organized in a cyclic fashion of at least nine cycles and the two significant digits of each multiple digit binary code are present in an XOR relationship having consecutive significant digits on all pairs of immediately adjacent tracks.

5. An optical disc as set forth in claim 4, wherein either of two significant digits encoded by said pairs of wobbled pits is shifted by one digit between immediately adjacent tracks of the optical disc.

6. An apparatus for driving an optical disc which has pairs of wobbled pits of a pattern, in which a code having two significant digits amongst multiple digits is repeated cyclically every predetermined number of tracks, said apparatus comprising:

an optical head, which is movable radially in at least one seek direction over said optical disc, for irradiating an optical spot to said optical disc and for detecting reflected light therefrom to convert the reflected light into an electric signal;

pattern detecting means for detecting a pattern of said code in said electric signal;

direction detecting means for detecting the seek direction of said optical head by recognizing a previous position of the optical head and where the detected pattern fits into a sequence of patterns on said optical disc;

speed detecting means for detecting a radial speed of said optical head relative to said optical disc from the detected pattern; and speed control means for controlling the speed of said optical head responsive to said detected seek direction and the radial detected speed of said optical head.

7. An optical disc comprising:

tracks provided concentrically or spirally;

pairs of wobbled pits for tracking, formed at every said track circumferentially, at a predetermined interval; and address pits for discriminating a tracking address, formed in a position spaced from said pair of wobbled pits circumferentially at a predetermined interval, said address pit being formed at a position encoding a significant digit of a multiple digit binary code, where presence of the address pit in a position, corresponding to a digit of the binary code, encodes a first binary value for the digit and absence of the address pit in said position encodes a second binary value for the digit, said binary code having two or more significant digits holding two or more insignificant digits therebetween, and said code being organized in a cyclic fashion of at least 9 cycles.

8. An optical disc as set forth in claim 7 wherein either of two significant digits of said codes is shifted by one digit between immediately adjacent tracks.

9. The disc of claim 8 wherein two or more significant digits are present in an XOR relationship of codes of immediately adjacent tracks, the XOR relationship having a plurality of consecutive significant digits.

10. A driving apparatus of an optical disc, which has address pits for discriminating a tracking address, formed in a position spaced from pairs of wobbled pits, in which a code having two or more significant digits amongst multiple digits is repeated cyclically every predetermined number of tracks, said apparatus comprising:

an optical head, which is movable radially in at least one seek direction over said optical disc, said optical head irradiating an optical spot to said optical disc and detecting light reflected therefrom to convert the reflected light into an electric signal;

address pit pattern detecting means for detecting a relative track address in said electric signal;

direction detecting means for detecting the seek direction of said optical head by recognizing a previous position of the optical head and where the detected track address fits in a sequence of track addresses on said optical disc;

speed detecting means for detecting radial speed of said optical head relative to said optical disc from the detected track address; and speed control means for controlling the speed of said optical head responsive to said detected seek direction and speed of said optical disc.

* * * * *